(12) United States Patent
Kaneko et al.

(10) Patent No.: US 7,668,743 B2
(45) Date of Patent: Feb. 23, 2010

(54) DEMAND-PRODUCTION SCHEME PLANNING APPARATUS, AND STORAGE MEDIUM

(75) Inventors: Kuniya Kaneko, Toyota (JP);
Hidetsugu Kojima, Nisshin (JP);
Hayaaki Fujiyoshi, Toyota (JP);
Toshihiro Nakamura, Toyota (JP);
Motohisa Kondo, Toyota (JP);
Hirosumi Suzuki, Aichi-ken (JP);
Kentaro Otokubo, Toyota (JP)

(73) Assignee: Toyota Jidosha Kabushiki Kaisha, Toyota-Shi, Aichi-Ken (JP)

( * ) Notice: Subject to any disclaimer, the term of this patent is extended or adjusted under 35 U.S.C. 154(b) by 743 days.

(21) Appl. No.: 09/729,800

(22) Filed: Dec. 6, 2000

(65) Prior Publication Data

US 2001/0020230 A1    Sep. 6, 2001

(30) Foreign Application Priority Data

| Dec. 6, 1999 | (JP) | ................................ 11-346761 |
| Jan. 21, 2000 | (JP) | ............................ 2000-013181 |
| Aug. 31, 2000 | (JP) | ............................ 2000-262310 |
| Aug. 31, 2000 | (JP) | ............................ 2000-262311 |

(51) Int. Cl.
G06F 9/46    (2006.01)

(52) U.S. Cl. ........................................................ 705/8

(58) Field of Classification Search ..................... 705/8, 705/9, 30, 29, 10
See application file for complete search history.

(56) References Cited

U.S. PATENT DOCUMENTS 5,148,370 A * 9/1992 Litt et al. .................... 700/104
5,233,533 A * 8/1993 Edstrom et al. ............. 700/103
5,237,496 A * 8/1993 Kagami et al. ................ 705/10
5,280,425 A * 1/1994 Hogge ......................... 712/300

(Continued)

FOREIGN PATENT DOCUMENTS

JP    8-212273    8/1996

(Continued)

OTHER PUBLICATIONS

Kudla, Capital rationing in small business, Oct. 1980, Journal of Small Business Management, v.18, i.4, p. 34-39 [ProQuest ABI/Inform Global].*

(Continued)

*Primary Examiner*—Jonathan G. Sterrett
*Assistant Examiner*—Peter Choi
(74) *Attorney, Agent, or Firm*—Buchanan Ingersoll & Rooney PC

(57) ABSTRACT

An apparatus for planning a demand-supply scheme of a supply chain so as to increase the corporate profit. A demand-supply scheme including order receipt, order placement, purchase and supply in the unit of a month of each step of a supply chain that includes various steps, such as product sales steps, product-producing steps, steps of producing parts for producing products, etc. is set so that the order placement to each producing step becomes within an order receivable range that is calculated from the equipment, the manpower, the number of times of operation, etc. of the producing step. Furthermore, a demand-supply scheme is planned and changed so as to maximize a profitability index that is calculated by using a cost regarding the production of a product that includes a material cost, a manpower cost, and an equipment cost, a stock management cost, a transportation cost, etc.

30 Claims, 15 Drawing Sheets

U.S. PATENT DOCUMENTS

| | | | | |
|---|---|---|---|---|
| 5,311,438 | A | * | 5/1994 | Sellers et al. ............... 700/96 |
| 5,630,123 | A | | 5/1997 | Hogge |
| 5,712,985 | A | * | 1/1998 | Lee et al. ............... 705/7 |
| 5,787,000 | A | * | 7/1998 | Lilly et al. ............... 700/95 |
| 5,897,624 | A | * | 4/1999 | Ramaswamy ............... 705/28 |
| 5,914,878 | A | * | 6/1999 | Yamamoto et al. ............... 700/106 |
| 6,006,196 | A | * | 12/1999 | Feigin et al. ............... 705/10 |
| 6,061,691 | A | * | 5/2000 | Fox ............... 707/104.1 |
| 6,078,900 | A | * | 6/2000 | Ettl et al. ............... 705/28 |
| 6,233,493 | B1 | * | 5/2001 | Cherneff et al. ............... 700/95 |
| 6,516,301 | B1 | * | 2/2003 | Aykin ............... 705/10 |
| 6,536,935 | B2 | * | 3/2003 | Parunak et al. ............... 700/99 |
| 6,671,673 | B1 | * | 12/2003 | Baseman et al. ............... 705/7 |
| 7,340,405 | B1 | * | 3/2008 | Gunther et al. ............... 705/6 |
| 2002/0156663 | A1 | * | 10/2002 | Weber et al. ............... 705/7 |

FOREIGN PATENT DOCUMENTS

| | | |
|---|---|---|
| JP | 9-30616 | 2/1997 |
| JP | 10-194412 | 7/1998 |
| JP | 10-240717 | 9/1998 |
| JP | 10 269294 A | 10/1998 |
| JP | 11-306233 A | 11/1999 |

OTHER PUBLICATIONS

Crittenden, Close the marketing/manufacturing gap, Sloan Management Review, Spring1992, v.33, n.3, p. 41, [online], [retrieved Sep. 28, 2005 via Dialog file 15:00616848] (16 pages).*

Oil & Gas Journal, Global petrochemical industry experiencing cyclic downturn, Mar. 29, 1993, v.91, n.13, p. 43-46 (4 pages).*

Waguespack, Internal benchmarking can increase refinery profits, Jul. 17, 1995, v.93, n.29, p. 57-61 (5 pages).*

Sogomonian, Aram G.; Tang, Christopher S. "A Modeling Framework for Coordinating Promotion and Production Decisions Within a Firm". Feb. 1993. Management Science. vol. 39, No. 2. pp. 191-203.*

Arifovic, Jasmina. "Genetic Algorithm Learning and the Cobweb Model". 1994. Journal of Economic Dynamics and Control. vol. 18, pp. 3-28.*

Japanese Office Action issued Dec. 7, 2005 and English translation thereof.

* cited by examiner

FIG. 15

RESTRICTING CONDITION TABLE

| CONDITION / VALUE | MAXIMUM | NORMAL | MINIMUM |
|---|---|---|---|
| NORMAL WORKING TIME [HOUR/DAY] | | A | |
| NORMAL CAPABILITY [OUTPUT/DAY] | Cmax | Cnor | Cmin |
| OVERTIME [HOUR/DAY] | Omax | | |
| HOLIDAY WORKING [DAY/MONTH] | Hmax | | |

DATABASE OF WORKING DAYS

| WORKING MONTH LOCATION | '99/1 | '99/2 | '99/3 | '99/4 | ... ... ... ... |
|---|---|---|---|---|---|
| SHOP A, JAPAN | 20 | 21 | 23 | 19 | |
| SHOP B, JAPAN | 20 | 21 | 23 | 19 | |
| ⋮ | | | | | |
| SHOP X, USA | 21 | 21 | 21 | 21 | |
| ⋮ | | | | | |

DATABASE OF COMPONENTS

DEMAND-PRODUCTION SCHEME PLANNING APPARATUS, AND STORAGE MEDIUM

INCORPORATION BY REFERENCE

The disclosures of Japanese Patent Application Nos. HEI 11-346761 filed on Dec. 6, 1999, 2000-13181 filed on Jan. 21, 2000, 2000-262310 filed on Aug. 31, 2000, and 2000-262310 filed on Aug. 31, 2000, including the specifications, drawings and abstracts are incorporated herein by reference in their entirety.

BACKGROUND OF THE INVENTION

1. Field of the Invention

The invention relates to demand-supply scheme planning apparatus and method, and a program for planning a demand-supply scheme, and a storage medium storing the program. More particularly, the invention relates to a demand-supply scheme planning apparatus for planning a demand-supply scheme in a supply chain in which at least two demand-supply steps having receipt of order, placement of order, purchase, and supply of a merchandise, are connected, and to a method for the same, and to a program for causing a computer to function as the demand-supply scheme planning apparatus, and to a storage medium storing the program in a computer-readable manner.

2. Description of the Related Art

Systems have been proposed which prompt related supplier factories to coordinate so that parts, raw materials and the like from the factories are supplied in accordance with orders from customers (for example, in U.S. Pat. No. 5,630,123). In such a system, a network is constructed by planning-coordination systems provided in factories. When there is a request from a factory on the network formed by the planning-coordination systems, a factory receiving the request responds to the request based on a production scheme of the factory planned by the planning system, so that the timing of supplying parts and raw materials can be appropriately adjusted.

However, in the aforementioned factories coordination system, consideration is not given to the time needed between receipt of an order and supply of the ordered item, the overall cost of a product, stock management, etc., so that it is difficult to make such a plan as to further enlarge the profit of a corporate entity. For example, if identical parts or raw materials can be purchased from a plurality of factories, the cost of a product varies depending on the proportions of volumes ordered with respect to the factories, and therefore the corporate profit also varies depending on the same.

SUMMARY OF THE INVENTION

Accordingly, the demand-supply scheme planning apparatus of the invention has an object to plan a demand-supply scheme for a supply chain so as to further increase corporate profit. The demand-supply scheme planning apparatus of the invention also has an object to determine the processing capability of each demand-supply step and contribute to a future expansion or reduction scheme.

In order to achieve the above-stated object, a demand-supply scheme planning apparatus of one exemplary embodiment of the invention includes first means for storing data regarding a cost and a time that are needed between a purchase step and a supply step of each demand-supply step of a supply chain in which a plurality of demand-supply steps each having an order receipt step, an order placement step, a purchase step, and a supply step that are related to a commodity, and second means for inputting an order receipt scheme of a demand-supply step of the plurality of steps that is located at a supply-side terminal of the supply chain. The apparatus also includes third means for determining scheme data regarding the order receipt step, the order placement step, the purchase step, and the supply step of each of the plurality of demand-supply steps based on the order receipt scheme inputted and a predetermined parameter, and fourth means for calculating a profitability index of the supply chain based on the scheme data determined and the data stored by the first means. The apparatus further includes fifth means for changing the parameter and sixth means for setting, as a demand-supply scheme, scheme data that maximizes the profitability index calculated by the fourth means, of the scheme data determined by the third means using the parameter changed.

Therefore, a demand-supply scheme with a maximum profitability index can be planned.

The demand-supply steps include production or sales steps that receive an order for, place an order for, purchase and supply a product or parts, and further include service provision steps that receive an order for, place an order for, purchase and supply services.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 15 indicates the content of a table of restricting conditions;

DETAILED DESCRIPTION OF PREFERRED EMBODIMENTS

Figure 1:
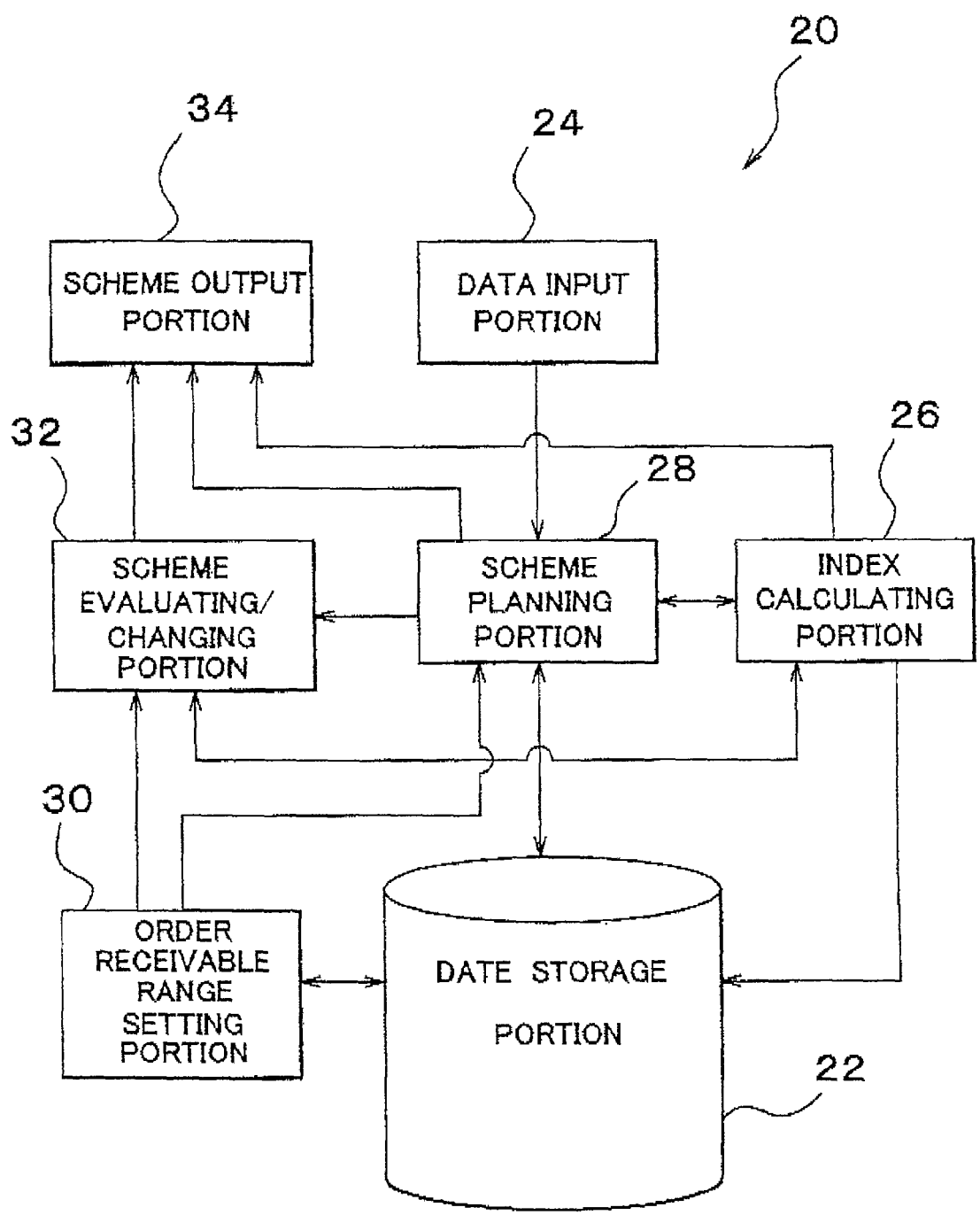
FIG. 1 is a construction diagram schematically illustrating a demand-supply scheme planning apparatus in accordance with an embodiment of the invention, as function blocks.
Figure 2:
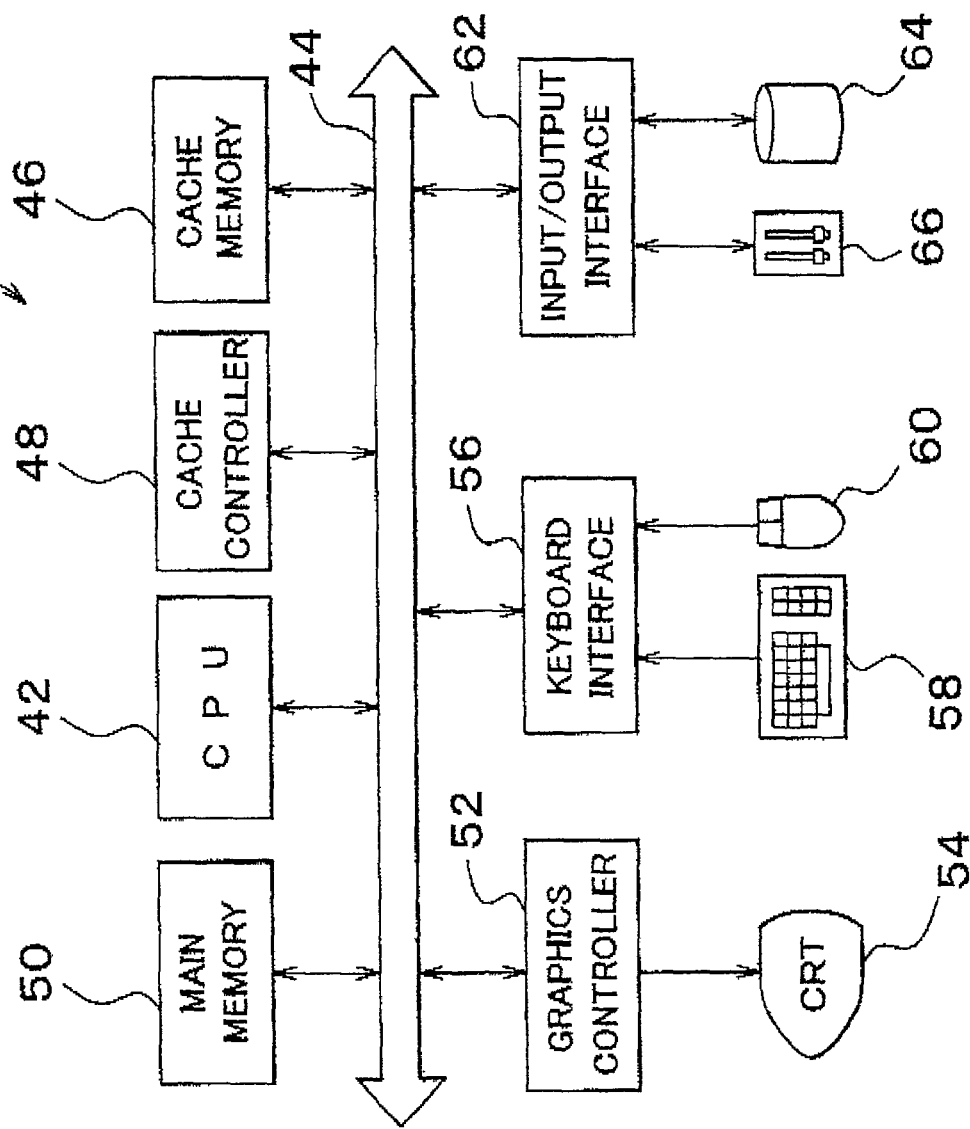
FIG. 2 is a construction diagram exemplifying a hardware construction of the demand-supply scheme planning apparatus.

Modes for carrying out the invention will be described with reference to preferred embodiments of the invention. FIG. 1 is a schematic illustration of a construction of a demand-supply scheme planning apparatus 20 in accordance with a first embodiment of the invention, in the form of function blocks. FIG. 2 is a diagram exemplifying a hardware construction of the demand-supply scheme planning apparatus 20 of the embodiment.

As shown in FIG. 2, the demand-supply scheme planning apparatus 20 has a hardware construction formed as a general-purpose computer that is formed by a CPU 42 that is a central processing unit, as a central component. A bus 44 connected to the CPU 42 is connected to a cache memory 46, a cache controller 48, a main memory 50, a graphics controller 52 connected to a CRT 54, a keyboard interface 56 connected to a keyboard 58 and a mouse 60, an input/output interface 62 connected to a hard disk 64 and a floppy disk 66, etc.

As shown in FIG. 1, the demand-supply scheme planning apparatus 20 has, as function blocks, a data storage portion 22 for storing various kinds of data regarding each step, a data input portion 24 for inputting a value of stock record in each step, sales schemes in sales steps, etc., an index calculating portion 26 for calculating a profitability index based on costs involved in production in each step and order receipt, order placement, purchase and supply in each step, etc., a scheme planningportion28 for planning a basic scheme of order receipt, order placement, purchase and supply in each step based on the input stock record value, the input sales scheme and a target value of stock, an order receivable range setting portion 30 for setting an order receivable range of each step based on order receipt range data stored in the data storage portion 22, a scheme evaluating/changing portion 32 for evaluating the feasibility of the basic scheme of each step and changing the basic scheme to a feasible one based on the order receivable range set for the step, and a scheme output portion 34 for outputting a planned basic scheme, a changed scheme, the evaluation of a scheme, the profitability index of a scheme, etc. These function portions are realized by the hardware construction exemplified in FIG. 2 and below-described software combined. The function of each function portion, including its correspondence to hardware construction, will be described in detail below.

The data storage portion 22, as a hardware construction, corresponds to an external storage device such as the hard disk 64 or the like. The data storage portion 22 stores data regarding costs (e.g., a material cost or a labor cost per product or component part, an equipment cost, a stock storage cost, etc.) that are needed in the process from the purchase of products or component parts to the supply of products of each step, step data that include data regarding durations, for example, a time needed to produce products or component parts, a storage time, etc., transportation data regarding translation costs and translation durations involved in supplying products or parts, target stock value data regarding a target stock value in each step, order receipt data regarding the equipment capability, the personnel setup, the operable range, etc. of each step for setting an order receivable range of each step, sales data regarding sales prices of products and the like, etc.

The index calculating portion 26, the scheme planning portion 28, the order receivable range setting portion 30 and the scheme evaluating/changing portion 32, as hardware constructions, correspond to the CPU 42 for executing processing programs, the main memory 50 storing programs, etc.

The index calculating portion 26, upon a request from the scheme planning portion 28 or the scheme evaluating/changing portion 32, calculates a profitability index based on data regarding order receipt, order placement, purchase and supply set for each step and the step data and the transportation data stored in the data storage portion 22, and sends the calculated profitability index back to the requesting portion. As for the profitability index, it is possible to use a generally-used return on assets (ROA=(income−expense)/assets). It is also possible to define and use an index determined as a multiplication product of the profit generating power and the profit generating speed (S-ROA=(sale−material cost input to production−operating cost)/material cost of stock), etc. Other profitability indexes may also be defined and used.

The scheme planning portion 28 sets a basic scheme, that is, order receipt, order placement, purchase and supply in each step, based on the record value of stock and the sales scheme inputted by the data input portion 24 and the stock target value data stored in the data storage portion 22. The processing operation thereof will be described below.

The order receivable range setting portion 30 sets an order receivable range of each step based on the order receipt range data regarding the equipment capability, personnel setup, operable range and the like of each step stored in the data storage portion 22. The order receivable range is, for example, a range set by an amount of production obtained as a lower limit value (or a value close to the lower limit value) of a normal process of each step and an upper limit value (or a value close to the upper limit value) of the normal process of each step. The lower limit value of the normal process can be determined, for example, as an amount of production (or an amount that is slightly greater than that amount of production) provided during a unit period (e.g., one month) if the production line is driven at a lowest speed on normal working days with a manpower required for the speed being arranged, without holiday operation nor overtime operation. The upper limit value of the normal process can be determined, for example, as an amount of production (or an amount that is slightly less than that amount of production) provided during a unit period (e.g., one month) if full operation with a maximum amount of holiday operation and overtime operation is performed at a highest production line speed with a manpower required for that speed being arranged.

The scheme evaluating/changing portion 32, based on comparison between the order receivable range set for each step by the order receivable range setting portion 30 and the basic scheme planned by the scheme planning portion 28, determines whether the processing capability of each step is too much or too little and, if the processing capability is too much or too little, changes the basic scheme to a feasible scheme by a time-related change in receipt of order, a change between steps, or a change in stock initial value.

The data input portion 24, as a hardware construction, corresponds to the keyboard interface 56, the keyboard 58 and the mouse 60. The scheme output portion 34, as a hardware construction, corresponds 't' the graphics controller 52 and the CRT 54.

Figure 3:
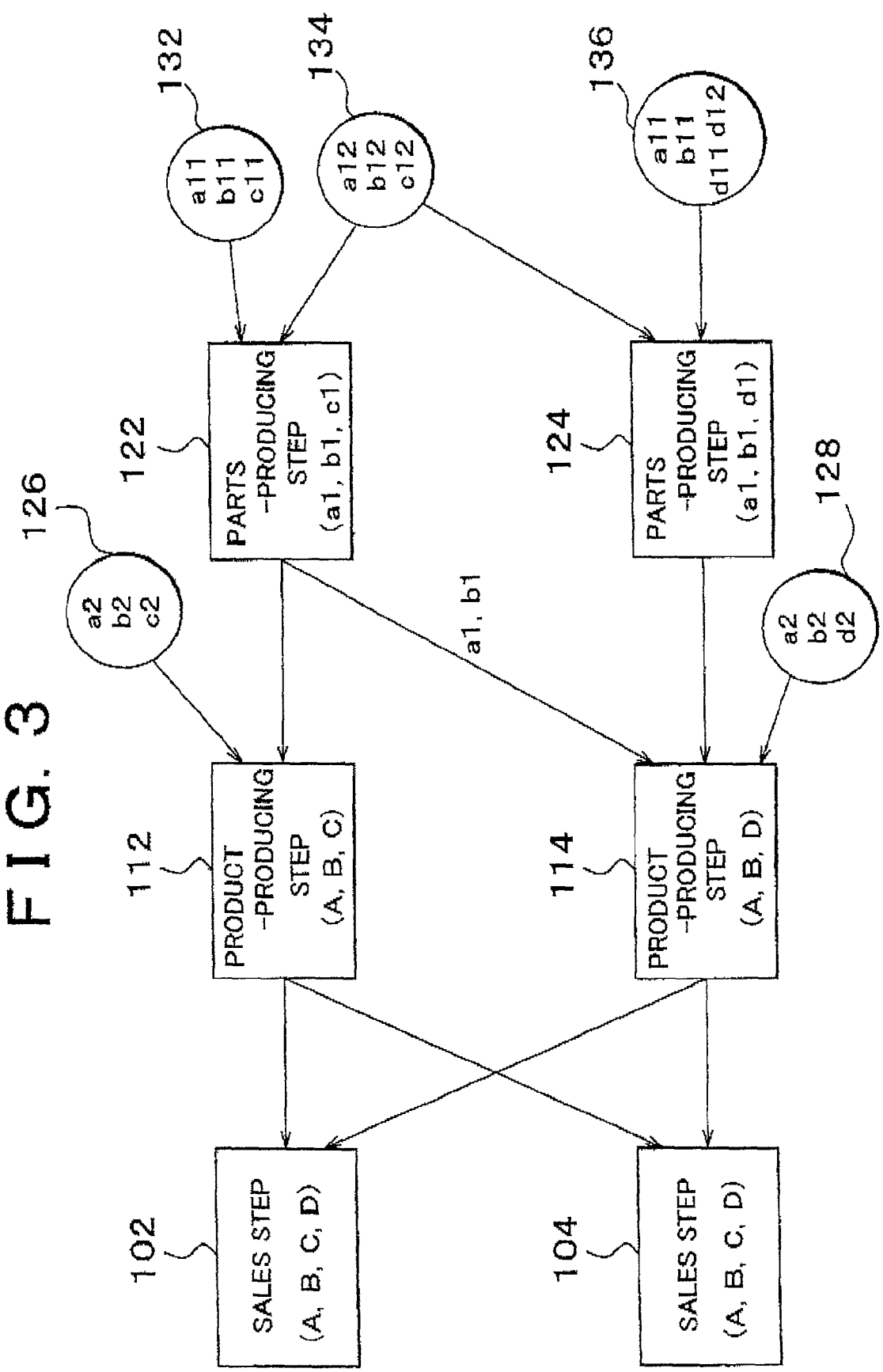
FIG. 3 is a construction diagram illustrating a supply chain as a specific example in which demand-supply schemes are planned by the demand-supply scheme planning apparatus.

The operation of the demand-supply scheme planning apparatus 20 will next be described. FIG. 3 is a construction diagram showing an example of a supply chain as a specific example in which a demand-supply scheme is planned by the demand-supply scheme planning apparatus 20. As shown in FIG. 3, the supply chain includes two sales step 102, 104 as dealers that sell products A, B, C, D, product-producing steps 112, 114 as product-producing factories each of which produces some of the products A, B, C, D, and supplies produced products to the two sales steps 102, 104, parts-producing steps 122, 124 as parts-producing factories each of which produces some of parts a1, b1, c1, d1 for producing the products A, B, C, D and supplies produced parts to the product-producing steps 112, 114, parts-supplying steps 126, 128 as parts supplier companies that supply some of parts a2, b2, c2, d2 for producing the products A, B, C, D to the product-producing steps 112, 114, and parts-supplying steps 132, 134, 136 as parts supplier companies that supply parts a11, a12, b11, b12, c11, c12, d11, d12 for producing the parts a1, b1, c1, d1 to the parts-producing steps 122, 124. In FIG. 3, parenthesized Roman letters in each step indicate products or parts, and arrows between steps indicate shipment in accordance with an order.

Figure 4:
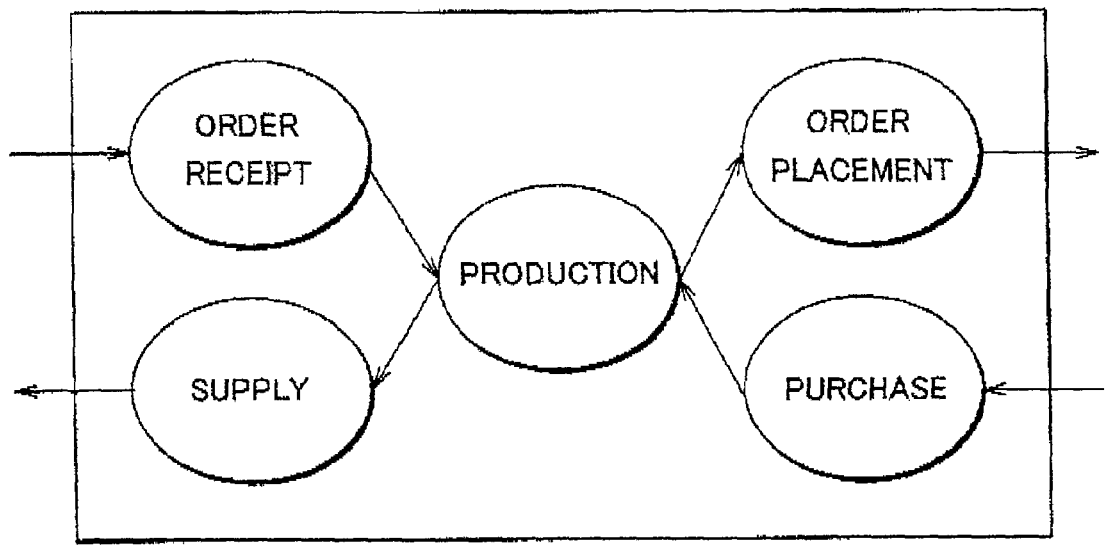
FIG. 4 is a schematic diagram illustrating demand-supply steps.

Each step is expressed basically as a demand-supply step that receives an order for products, places orders for component parts needed to produce the products, produces the products using component parts purchased in accordance with the orders, and supplies the produced products as exemplified in a schematic diagram of FIG. 4, and more specifically as in the product-producing steps 112, 114. The sales steps 102, 104 can be regarded the same as the step exemplified in FIG. 4, assuming that the component parts in the product-producing steps 112, 114 are replaced by products and that no production is performed. The parts-producing steps 122, 124 can be regarded the same as the step exemplified in FIG. 4, if the products in the product-producing steps 112, 114 are replaced by parts. The parts-supplying steps 126, 128, 132, 134, 136 can also be regarded the same as the step exemplified in FIG. 4 provided that none of production, order placement and purchase is performed.

Figure 5:
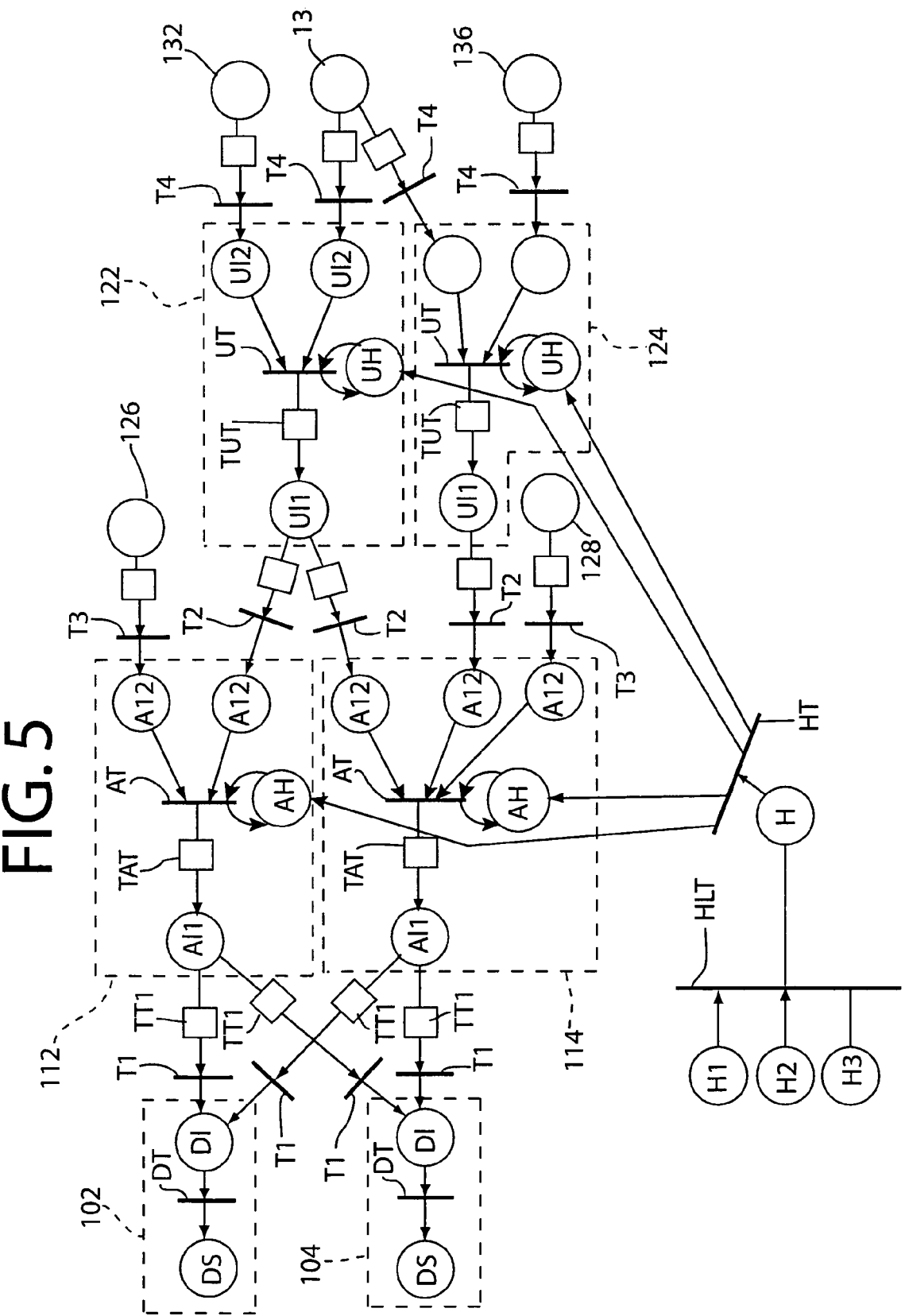
FIG. 5 is an illustration exemplifying a Petri Net model regarding products A, B in a supply chain.

FIG. 5 exemplifies a Petri Net model regarding products A, B in the supply chain illustrated as a specific example in FIG. 3. In FIG. 5, steps and resources are represented by circle symbols, and actions are represented by vertical bar symbols, and durations needed for the actions are represented by square symbols. In this Petri Net model, the sales step 102, 104, the product-producing steps 112, 114, and the parts-producing steps 122, 124 each have places and transitions as follows.

<Sales Steps 102 And 104>
product sales place DS
sales transition DT
product stock place DI
<Product-producing Steps 112 And 114>
product stock place AI1
product-producing transition AT
equipment personnel retention place AH
parts stock places AI2
<Parts-producing Steps 122 And 124>
parts stock place UI1
equipment personnel retention place UH
parts-producing transition UT
parts stock places UI2

A design is made such that equipment and personnel are distributed to the equipment personnel retention places AH, UH, which retain equipment and personnel and which are provided for the product-producing transitions AT and the parts-producing transitions UT, from a corporate's entire resources storage place H via a resources distribution transition HT. The corporate's entire resources storage place H is designed so as to borrow equipment and personnel from resources supplying organizations H1, H2, H3 via resources borrowing transitions HLT. The product stock places DI and the product stock place AI1 are connected via transporting transitions T1. The parts stock places AI2 and the parts stock places UI1 are connected by transporting transitions T2 or T3. The parts stock places UI2 and the parts-supplying steps 132, 134, 136 are connected by transporting transitions T4.

This Petri Net model operates as follows. When a sales scheme is inputted to the product sales places DS of the sales step 102, 104, each sales transition DT fire to move a token expressing a quantity of product in accordance with the sales scheme from the product stock place DI to the product sales place DS. Based on the stock target values pre-set in the product stock places DI and the stocks after tokens are moved, orders placed from the sales step 102, 104 to the product-producing steps 112, 114 are calculated. The orders placed to the product-producing steps 112, 114 are calculated through the use of the product-producing capabilities, profitability indexes, etc., of the product-producing steps 112, 114. This calculation will be described below. After the orders to the product-producing steps 112, 114 are determined, the transporting transitions T1 fire. After the elapse of a transportation time TT1, tokens in accordance with the orders are moved from the product stock places AI1 of the product-producing steps 112, 114 to the product stock places DI of the sales step 102, 104.

When the products are shipped from the product stock places AI1 of the product-producing steps 112, 114 (when tokens are moved), the product-producing transitions AT fire along with the movement of tokens in order to fill or eliminate deviations of the stocks in the product stock places AI1 from the stock target values pre-set in the product stock places AI1. The conditions for the firing of each product-producing transition AT include a condition that the stock of component parts needed to produce the products is present in parts stock places AI2, and a condition that the equipment and the personnel existing in the equipment personnel retention place AH are in an operable state, as well. When a product-producing transition AT fires, tokens expressing parts in the parts stock places AI2 are eliminated. After the elapse of a predetermined time for producing the products, tokens representing produced products are generated in the product stock place AI1. The operations of the transporting transitions T2, T3, T4 from the parts-producing steps 122, 124 and the parts-supplying steps 126, 128, 132, 134, 136, and the operations of the parts-producing transitions UT in the parts-producing steps 122, 124 are substantially the same as the operation described above.

A Petri Net model regarding a product C may be considered in portions of the supply chain indicated in FIG. 3 that relate to the product C. That is, the Petri Net model regarding the product C is a model obtained by eliminating the product-producing step 114, the parts-producing step 124, and the parts-supplying steps 128, 136 from the Petri Net model shown in FIG. 5. Similarly, a Petri Net model regarding a product D is a model obtained by eliminating the product-producing step 112, the parts-producing step 122, and the parts-supplying steps 126, 132 from the Petri Net model shown in FIG. 5.

Figure 6:
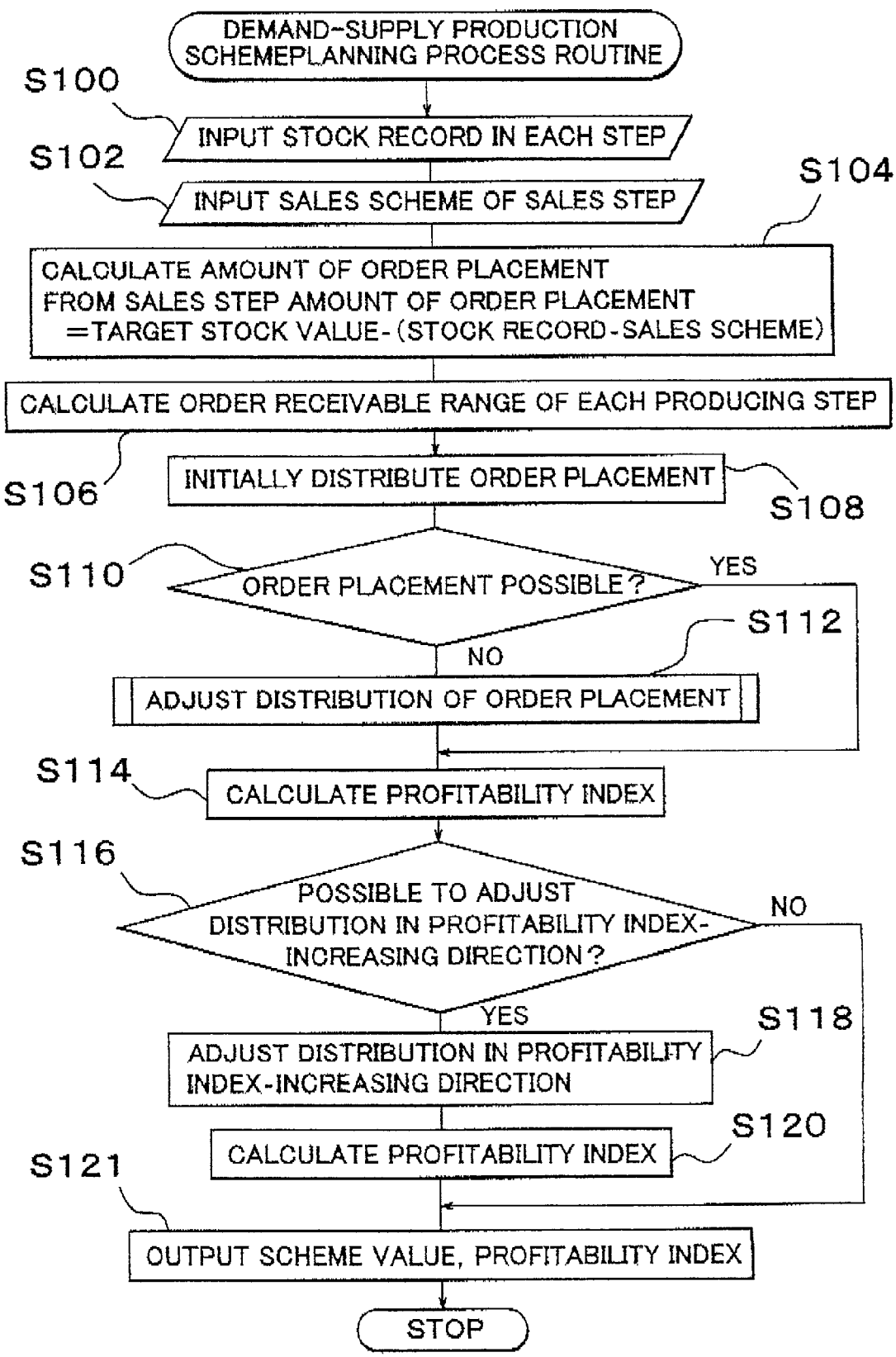
FIG. 6 is a flowchart illustrating a demand-supply scheme planning process routine executed by the demand-supply scheme planning apparatus.

Next, the planning of a specific demand-supply scheme with reference to the Petri Net model prepared for each product will be described. FIG. 6 is a flowchart exemplifying a demand-supply scheme planning process routine executed by the demand-supply scheme planning apparatus 20 of the embodiment. In this routine, a demand-supply scheme is planned as a scheme for a unit period (e.g., a unit of a month). When the routine is executed, the CPU 42 of the demand-supply scheme planning apparatus 20 first executes a process of inputting the stock record of each step (step S100). This process is a process of inputting all the records of stocks regarding the products A, B, C, D in the product stock places DI, the product stock places AI1, AI2 and the parts stock places UI1, UI2 in the Petri Net model. For example, the CPU 42 displays on the CRT 54 an actual stock record input screen to prompt for inputs via the data input portion 24 such as the keyboard 58 or the like, and waits for an operating person to input stock records and input "end of input". As for the stock record input screen, it is also possible to use a screen which has input fields for the stock records of products or parts handled with respect to the stock places in the Petri Net model and which changes the color of a stock record input field in order to indicate to the operating person which field to input to, or a screen displaying a table or the like of the names of the stock places and the input fields for stock records to be inputted to the stock places, etc. As for the stock records, it is possible to input stock records of products or component parts of each step from a computer installed in the step or the like, via a communication line.

After executing the process of inputting the stock record of each step, the CPU 42 executes a process of inputting a sales scheme for a unit period for each of the sales steps 102, 104 (step S102). In this process, the quantities of the products A, B, C, D that are planned to be sold in the product sales places DS are inputted. For example, the CPU 42 displays on the CRT 54 a sales scheme input screen to prompt for inputs via the data input portion 24 such as the keyboard 58 or the like, and waits for the operating person to input sales schemes and input "end of input". As for the sales scheme input screen, it is also possible to use a screen in which sales quantity input fields are provided for the product sales places DS in the Petri Net model and the color of an input field is changed in order to indicate to the operating person which field to input to, or a screen displaying a table or the like of the names of the product sales places DS and the input fields for sales schemes to be inputted to the product sales places DS, etc. As for the sales schemes, it is possible to input a sales scheme for each of the sales steps 102, 104 from a computer installed in the step or the like, via a communication line.

After the sales schemes are inputted, the CPU 42 executes a process of calculating a total of orders for each product placed from each of the sales steps 102, 104 to the product-producing steps 112, 114 (amount of order placed), separately for each sale step (step S104). The amount of order placed by each sales step is determined by subtracting a deviation between the input stock record and the sales scheme for the sales step from the stock target value data stored for the sale step in the hard disk 64 functioning as the data storage portion 22. [amount of order placement=stock target value−(stock record−sales scheme)]

Next, the CPU 42 executes a process of calculating an order receivable range (production possible range) of each of the product-producing steps 112, 114 or each of the parts-producing steps 122, 124 (step S106). The order receivable range is calculated separately for each production step based on the data regarding the equipment capability, personnel setup, operable range, etc., of the production step stored in the data storage portion 22, as mentioned above.

Subsequently, the CPU 42 executes a process of initially distributing the amount of order for each product placed by each of the sales steps 102, 104 (step S108). With regard to the products A, B, the initial distribution is performed by proportionally distributing the amount of order to the product-producing steps within the upper limit values of the order receivable ranges of the product-producing steps. With regard to the product C, the entire amount of order is placed to the product-producing step 112. With regard to the product D, the entire amount of order is placed to the product-producing step 114.

After the initial distribution of the amounts of orders from each of the sales steps 102, 104, the CPU 42 executes a process of determining whether the initially distributed amounts of orders placed can be receivable by the product-producing steps 112, 114 (whether the amounts can be produced thereby) (step S110). In this process, it is determined whether the amounts of order initially distributed to the product-producing steps 112,114 is within the order receivable ranges calculated for the product-producing steps 112,114, respectively.

Figure 7:
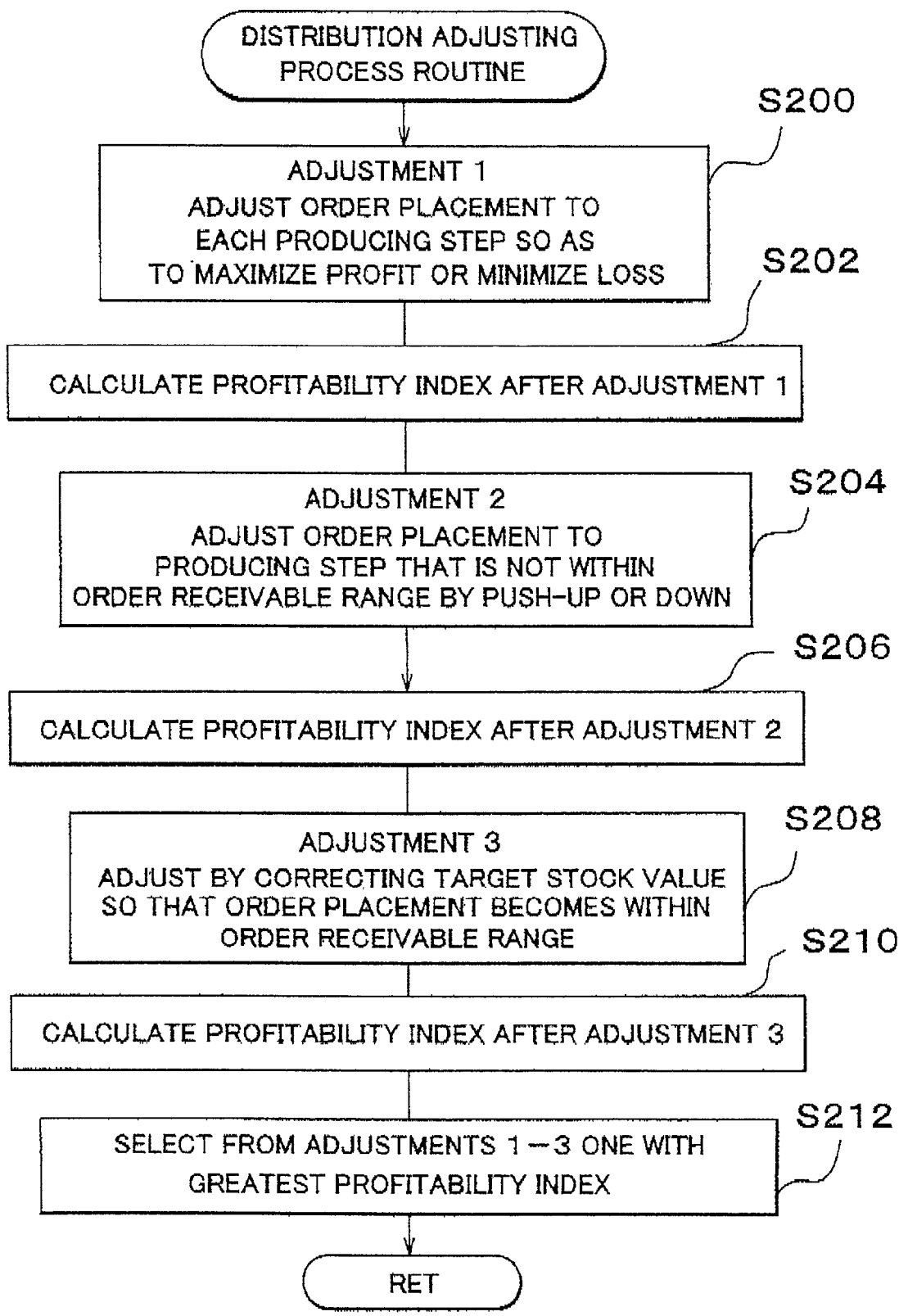
FIG. 7 is a flowchart illustrating a distribution adjusting process routine executed by the demand-supply scheme planning apparatus.

If the result of determination is negative, that is, if any one of the initially distributed amounts of orders placed is not within the corresponding order receivable range of the product-producing step, the CPU 42 executes a process of adjusting the distribution of the initially distributed amounts of order placement (step S112). This process is executed by a distribution adjusting process routine exemplified in FIG. 7. When the distribution adjusting process routine is executed, the CPU 42 calculates adjustments 1, 2, 3, and calculates profitability indexes obtained by the adjustments 1-3 (step S200-S210). Subsequently, the CPU 42 selects from the adjustments 1-3 an adjustment that achieves the greatest profitability index (step S212), and then ends the routine. The contents of the adjustments 1-3 will be described below. To simplify the description, an adjustment achieving the greatest profitability index is selected from the adjustments 1-3 in this embodiment. However, the adjustments 1-3 may be used in a combined manner to determine an adjustment that achieves a maximum profitability index.

Figure 8:
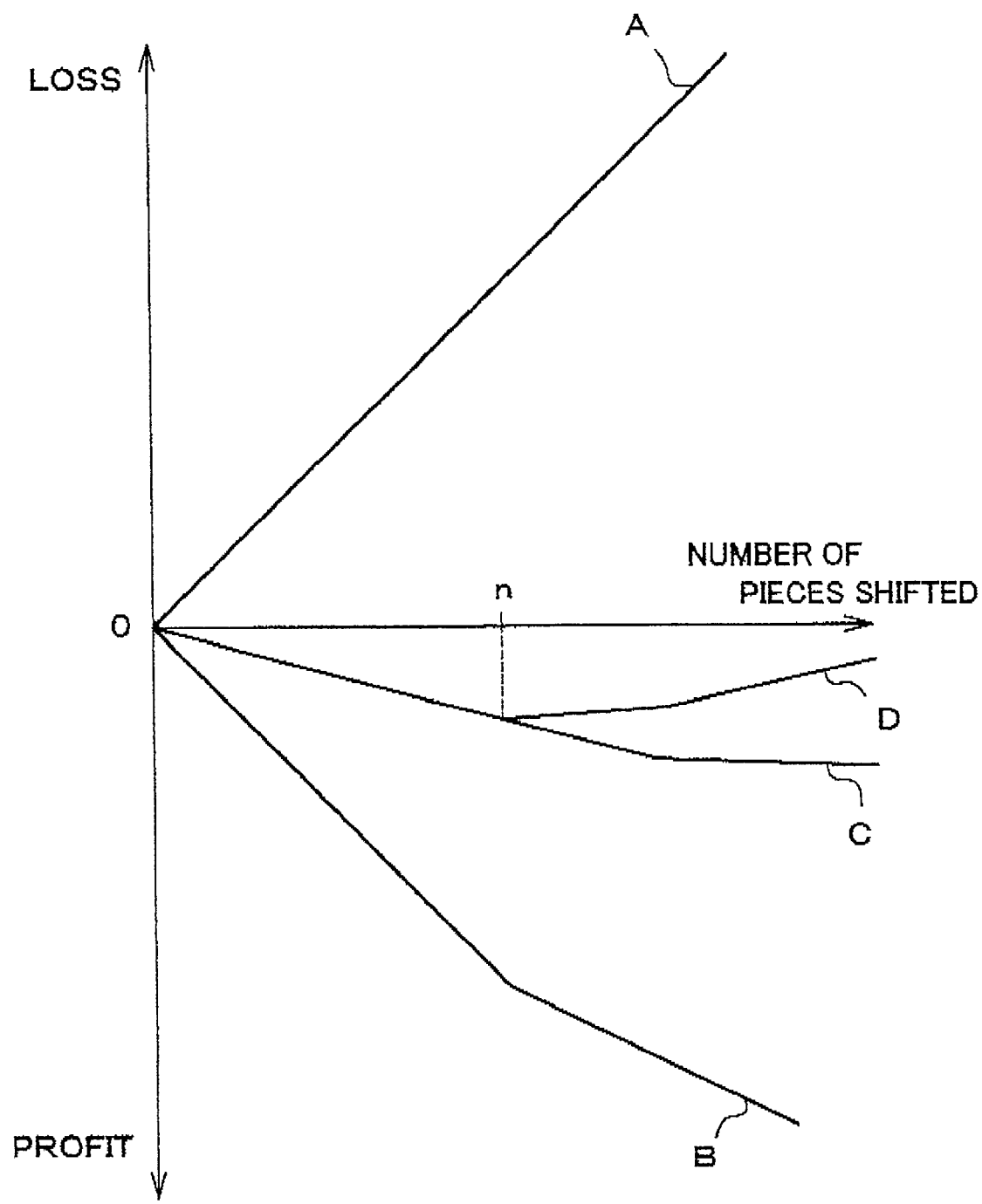
FIG. 8 is a diagram indicating relationships between profit and adjustment and between loss and adjustment when order placement is adjusted by adjustment 1.

The adjustment 1 adjusts the initial distribution of the amount of order so that each one of the amounts of orders placed by the sales steps 102, 104 is within the corresponding order receivable range of the product-producing step 112, 114 while a maximum profit or a minimum loss is achieved. A case where an amount of order for the product A placed from the sales step 102 to the product-producing step 112 is shifted to the product-producing step 114 because it is determined that the amount of order initially distributed to the product-producing step 112 is above the order receivable range thereof and that the amount of order initially distributed to the product-producing step 114 is below the order receivable range thereof, will now be considered. FIG. 8 indicates an example of the relationship between the profit or loss and the adjustment where the order placement is adjusted by the adjustment 1. In the diagram, a line A indicates a relationship between the cost and the number of pieces shifted when an amount of production of the product A is shifted from the product-producing step 112 to the product-producing step 114. A line B indicates a relationship between the number of pieces shifted when an adjustment is made so as to resolve the insufficient order receipt of the product-producing step 114 and the cost converted as profit from the merit of the adjustment. A line C indicates a relationship between the number of pieces shifted when an adjustment is made in such a direction as to resolve the excessive order receipt of the product-producing step 112 and the cost converted as profit from the merit of the adjustment. A line D indicates a sum of the lines A, B and C. In FIG. 8, the profit indicated by the line D becomes maximum when n number of pieces of order are shifted from the product-producing step 112 to the product-producing step 114. Therefore, "adjustment of shifting n number of pieces" is obtained as a result of the adjustment 1. In FIG. 8, an example of adjustment in which a shift is made in the amount of order placed for the product A is indicated for the sake of simple description. However, in this embodiment, the adjustment is made by simultaneously performing a shift in the order placement for the product A and a shift in the order placement for the product B such that the loss minimizes or the profit maximizes. It is also possible to perform an adjustment by shifting the order placement for the product B.

Figure 9:
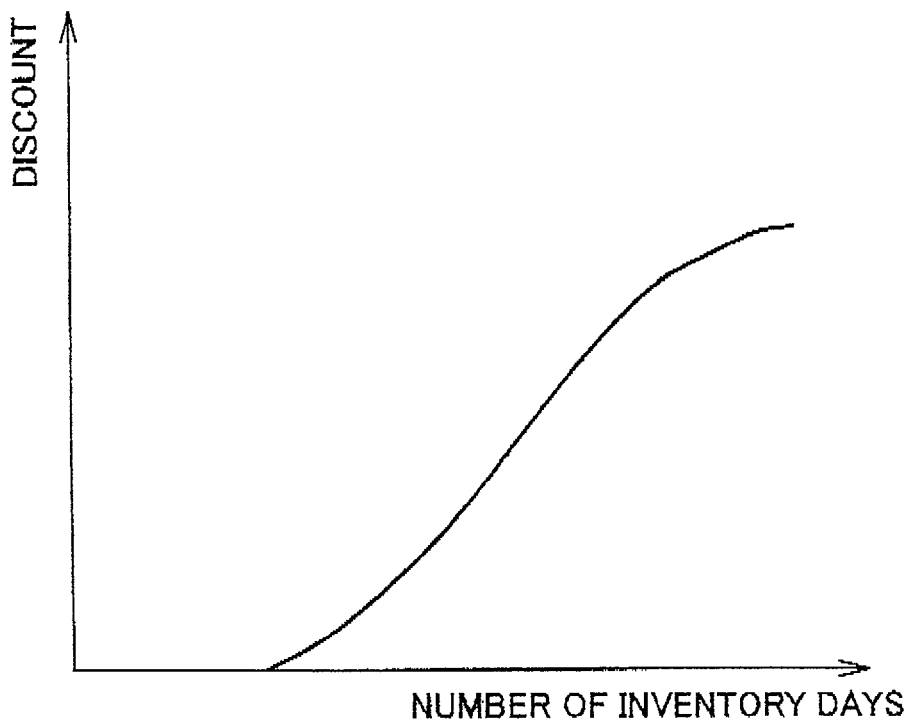
FIG. 9 is a diagram indicating a relationship between the number of inventory days of products and the price discount.
Figure 10:
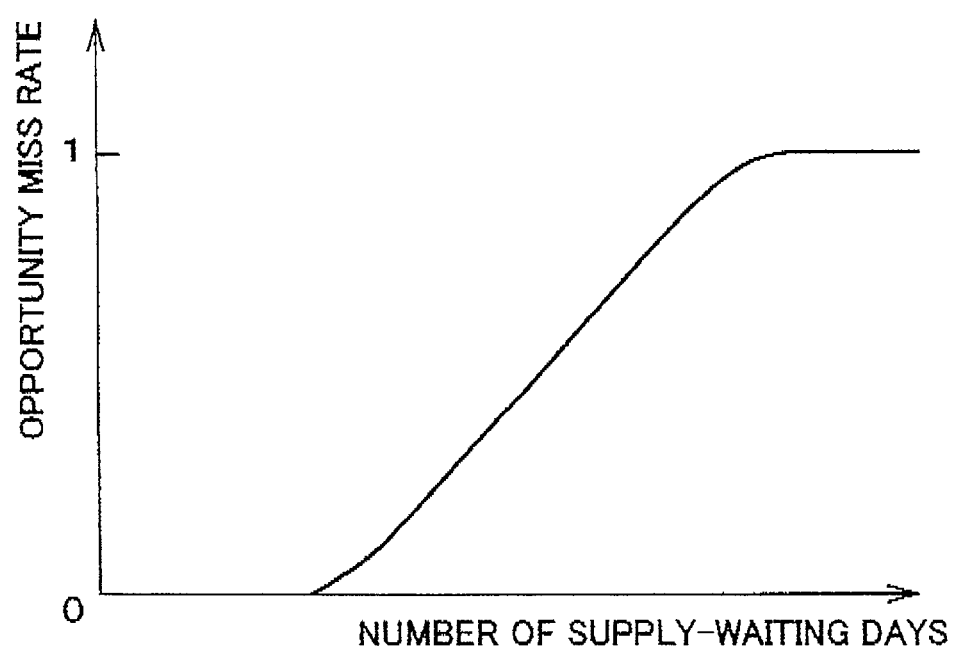
FIG. 10 is a diagram indicting a relationship between the number of production supply-waiting days and the sales opportunity miss factor.

The adjustment 2 adjusts an order placement for a producing step which is not within the order receivable range thereof by pushing the order placement up or down in time so that the loss minimizes. The loss caused by a push-up of order placement includes the stock management cost caused by the push-up, a price reduction due to the product aging, etc. FIG. 9 indicates an example of the relationship between the number of inventory days and the price discount of a product. If the demand-supply scheme processing is performed in the unit of month, the discount caused by the push-up to the preceding month can be determined based on the number of inventory days obtained by adding 30 days to the normal number of inventory days. The loss caused by a push-down of order placement includes a loss caused by missing an opportunity for sale due to a failure to immediately supply a product, a price discount for a delay in the supply of a product, etc. FIG. 10 indicates an example of the relationship between the number of days of waiting the supply of a product and the sales opportunity miss factor. The opportunity miss factor is a factor ranging from "value zero", meaning no opportunity miss, to "value 1", meaning 100% in opportunity miss rate. If the demand-supply scheme processing is performed in the unit of month as mentioned above, the opportunity miss factor for the push-down to the following month can be determined based on the number of supply-waiting days obtained by adding 30 days to the normal number of supply-waiting days. The relationship between the number of supply-waiting days and the opportunity miss factor varies depending on the kinds of products, the presence/absence of a rival product, etc., and can be determined separately for each product. The push-up has a restriction that the amount of a push-up be within a "push-up possible range" determined from the preceding month's demand-supply scheme, that is, a range determined as a deviation between the scheme value of order receipt and the upper limit value of the order receivable range of the producing step in the preceding month.

The adjustment 3 corrects the target values of stock of products or parts in the sales steps 102, 104, the product-producing steps 112, 114, etc. The amount of order placement can be adjusted in the increasing or decreasing direction by correcting the target stock value upward or downward since the amount of order placement is calculated by subtracting the deviation between the stock record and the sales scheme from the target stock value of each step. The loss caused by a change in the target stock value includes a loss caused by missing a sales opportunity due to an insufficient stock and the like in the case of a downward correction of the target stock value, and includes a stock management cost, a discount cost due to the product aging, etc. in the case of an upward correction of the target stock value.

Further description of the demand-supply scheme planning process routine of FIG. 6 will be made. After the order placement adjustment is performed in step S112 following the negative determination in step S110, the CPU 42 calculates a profitability index based on the present scheme value (step S114). Subsequently, the CPU 42 determines whether the order placement distribution can be adjusted in such a direction as to increase the profitability index (step S116). If the result of determination in step S110 is affirmative, the order placed is an initial order distributed based on the distribution proportional to the maximum value in the order receivable range, and therefore the order placement is not distributed in such a manner that the profit maximizes. Even if the order placement distribution adjusting process is executed in step S112, the adjusting process merely performs an order placement adjustment with respect to the producing steps in which the initial distribution of order placement is not within the order receivable range, and therefore a producing step whose initial distribution of order placement is within its order receivable range does not have such a distribution of order placement that the profit maximizes. Therefore, the determination in step S116 is necessary. The determination regarding the possibility of distribution adjustment is performed based on an increase or decrease in profit caused by a shift of a portion of the order for a product to another producing step, and an increase or decrease in profit based on a deviation between the loss caused by pushing a portion of the order up or down in time and the increase in profit in the preceding month's scheme.

If order placement distribution adjustment is possible, the CPU 42 executes such an order placement distribution adjustment that the profitability index increases, by using a technique similar to the adjustments 1-3 (step S118), and calculates a profitability index based on the scheme value obtained after the distribution adjustment (step S120). Subsequently, the CPU 42 outputs the profitability index and the scheme value obtained after the distribution adjustment to the CRT 54 or the like (step S122), and then ends the routine.

The above description is made mainly with regard to the processing based on the order for products placed from the sales steps 102, 104 to the product-producing steps 112, 114. The order for parts placed from the product-producing steps 112, 114 to the parts-producing steps 122, 124 is similarly performed. A scheme adjusted so as to achieve a great profitability index as a whole is planned, and the scheme value and the profitability index are outputted to the CRT 54 or the like.

The demand-supply scheme planning apparatus 20 described above is able to plan a demand-supply scheme that is feasible and achieves a great profitability index. Therefore, by performing the planned demand-supply scheme, it is possible to cause the steps to smoothly and efficiently function and, it is possible to increase profit.

Although the demand-supply scheme planning apparatus 20 selects from the adjustments 1-3 an adjustment that achieves a maximum profitability index, it is also possible to select any one of the adjustments 1-3 for adjustment of the order placement distribution, or to select any two of the adjustments 1-3 for the adjustment, or to use the adjustments 1-3 in a combined manner for the adjustment. Other manners of adjustment are also possible.

Furthermore, although in the demand-supply scheme planning apparatus 20, the initial distribution of the order placement from the sales steps 102, 104 to the product-producing steps 112, 114 is distribution proportional to the upper limit values of the order receivable ranges of the product-producing steps 112, 114, the initial distribution may also be such distribution that the product cost (sum of the cost regarding production of a product and the transportation cost) becomes minimum. For example, in a case where the cost of transportation of the products A, B from the product-producing step 112 to the sales step 102 is less than the cost of transportation of the products from the product-producing step 114 to the sales step 102, and where the cost of transportation of the products A, B from the product-producing step 114 to the sales step 104 is less than the cost of transportation of the products from the product-producing step 112 to the sales step 104, and where the cost regarding the production of the products A, B in the product-producing step 112 equals the cost regarding the production of the products A, B in the product-producing step 114, the initial distribution is performed in such a manner that the order for the products A, B placed by the sales step 102 is entirely distributed to the product-producing step 112, and that the order for the products A, B placed by the sales step 104 is entirely distributed to the product-producing step 114. The initial distribution may be subjected to the order placement distribution adjustment in relation to the order receivable ranges of the producing steps.

Figure 11:
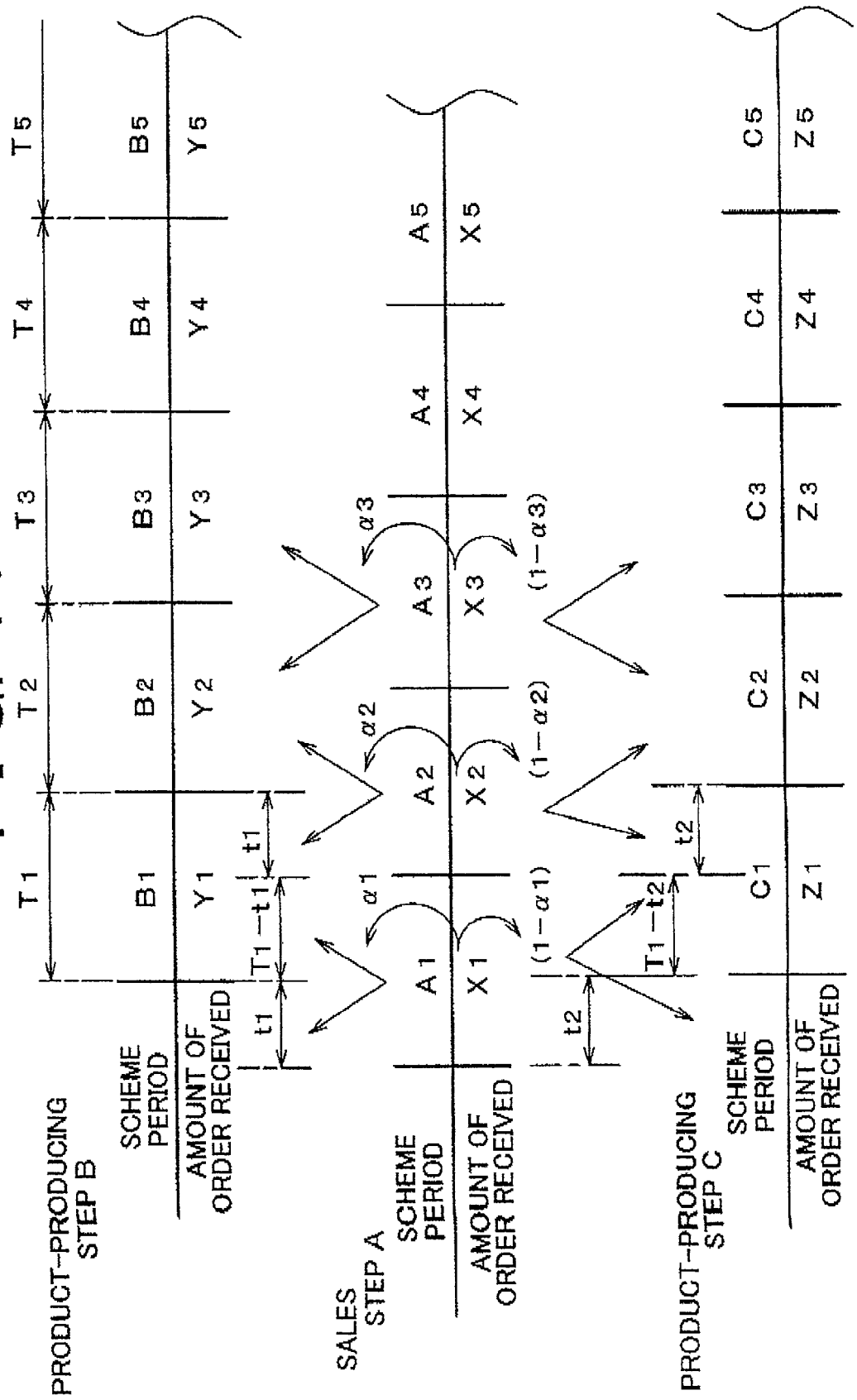
FIG. 11 is a model diagram in which amounts of order receipt in two product-producing steps are planned with respect to the amount of order placement of a sales step of every scheme month.
Figure 12:
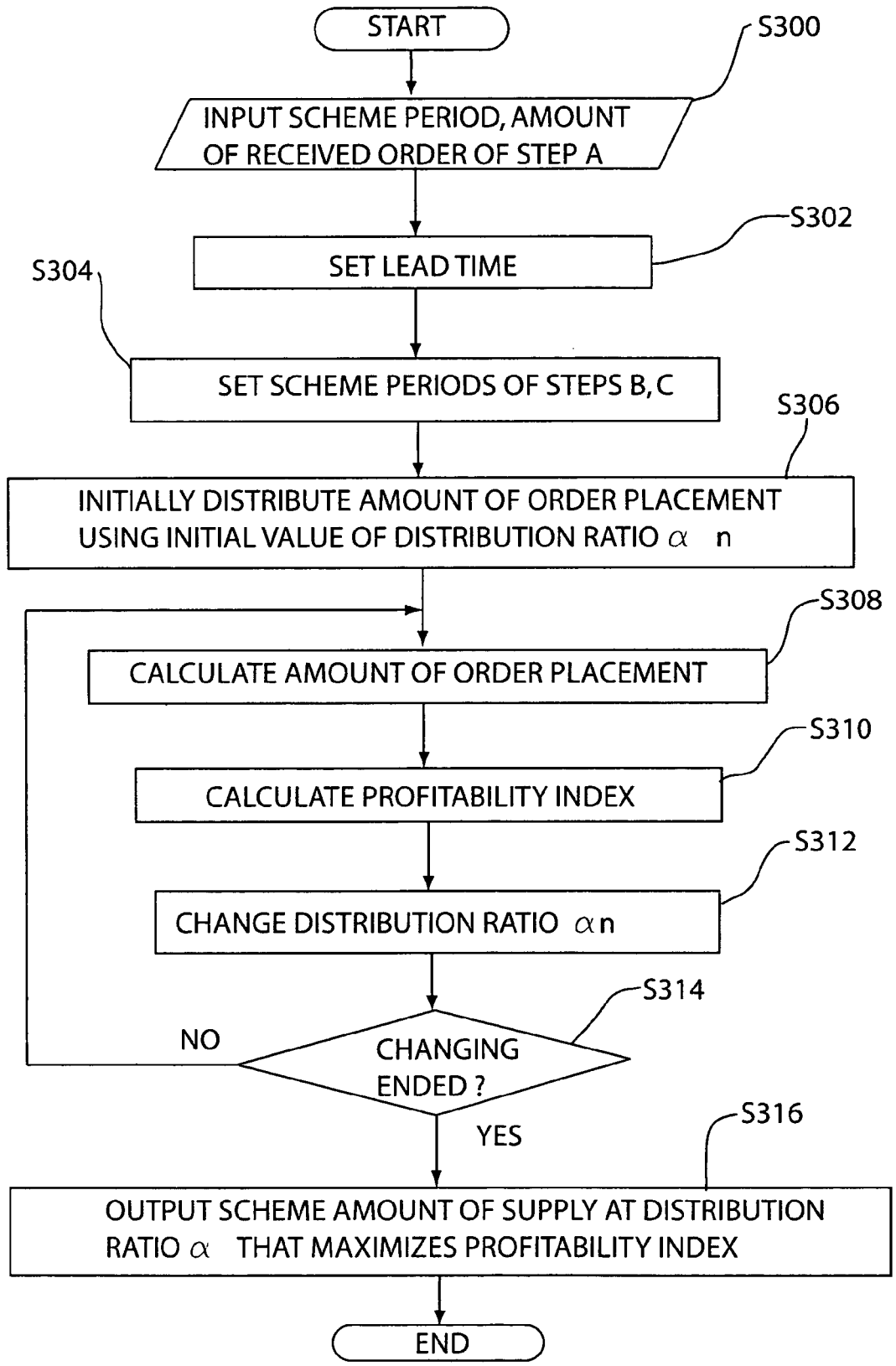
FIG. 12 is a flowchart illustrating a scheme process routine.

Furthermore, the initial distribution of the order placed from the sales steps 102, 104 to the product-producing steps 112, 114 may also be performed by using a lead time that is a time needed between the order placement from the sales steps 102, 104 and the purchase from the product-producing steps 112, 114. For example, a case where purchase from product-producing steps B, C is performed in response to an order placed from a sales step A is illustrated in FIG. 11. FIG. 12 is a flowchart illustrating a process routine.

When the routine is executed, the CPU 42 of the demand-supply scheme planning apparatus 20 executes a process of inputting an amount of order received Xn for a scheme period (in a unit of a month, a week, a day, etc.) An (n=1, 2, 3, . . . (integer)) of the sales step A via the data input portion such as the keyboard 58 or the like (S300). Subsequently, the CPU 42 calculates lead times t1, t2 that are time durations needed between the order for products placed from the sales step A to product-producing steps and the purchase of the products (S302). The CPU 42 shifts the scheme periods Bn (n=1, 2, 3, . . . (integer)) and Cn (n=1, 2, 3, . . . (integer)) of the product-producing steps B, C from the scheme period An of the sales step A by the lead times t1 and t2 so as to set the scheme periods An, Bn, Cn with equal spans (S304). Next, the CPU 42 distributes the amount of order placement Xn to the product-producing steps B, C using a distribution ratio αn (arbitrary value) that is set for each scheme period An of the sales step A (S306). Subsequently, the CPU 42 calculates amounts of order Yn, Zn placed from the sales step A to the scheme periods Bn, Cn of the product-producing steps, as in the following equations (1), (2) (S308). Based on the calculated amounts of order placement Yn, Zn, the CPU 42 calculates a profitability index (S310). Since the distribution ratio αn is a parameter, the distribution ratio αn is changed in accordance with the restricting conditions (the order receivable ranges of the product-producing steps B and C, and the like) (S312). The distribution ratio αn is changed until the profitability index maximizes (S314). After the changing of the distribution ratio αn ends, the CPU 42 outputs the presently calculated amounts of order placement Yn, Zn as scheme values (S316), and then ends the routine. In this manner, the amount of order placement can be more appropriately distributed, taking into consideration the lead time, that is, a time required between order and purchase. Furthermore, since the amount of order Yn, Zn received by the product-producing steps B, C for the scheme periods Bn, Cn are calculated based on the distribution ratio αn that is determined so as to maximize the profitability index within the range of restricting conditions such as the order receivable ranges, it is possible to plan such a scheme that the profit of the corporate entity becomes as great as possible. The distribution based on the lead time is not limited to the initial distribution at the time of order placed by a sales step, but is also applicable to distribution at the time of order placed by a product-producing step or order placed by a parts-producing step.

$$Y_n = \alpha_n \times X_n \times \left(\frac{T_n - t_1}{T_n}\right) + \alpha_{n+1} \times X_{n+1} \times \frac{t_1}{T_{n+1}} \quad (1)$$

$$Z_n = (1 - \alpha_n) \times X_n \times \left(\frac{T_n - t_2}{T_n}\right) + (1 - \alpha_{n+1}) \times X_{n+1} \times \frac{t_2}{T_{n+1}} \quad (2)$$

Although FIG. 11 illustrates an example in which the product-producing steps B, C receives orders for products from the single sales step A, products may also be supplied from a plurality of product-producing steps to a plurality of sales steps. In such a case, a lead time of each product-producing step may be set separately for each sales step, or may be fixed beforehand.

Figure 13:
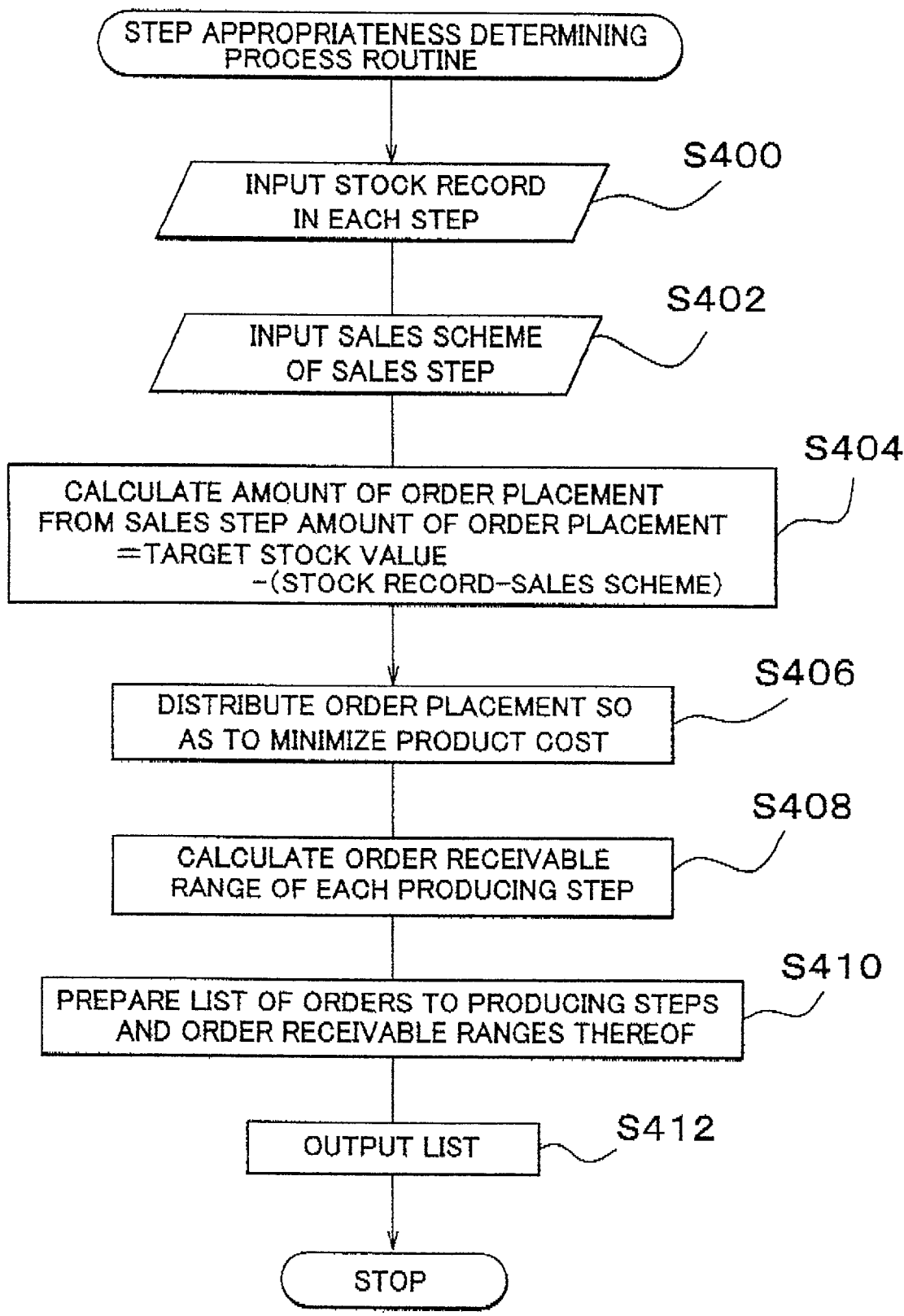
FIG. 13 is a flowchart illustrating an example of a step appropriateness determining process routine executed to determine appropriateness of each step.

The demand-supply scheme planning apparatus 20 of this embodiment also functions as a determining apparatus for determining the present appropriateness of each step. FIG. 13 is a flowchart exemplifying a step appropriateness determining process routine executed to determine the appropriateness of each step. In this routine, the determination regarding each step is performed through the use of the scheme in the unit of month as in the planning of a demand-supply scheme. When this routine is executed, the CPU 42 of the demand-supply scheme planning apparatus 20 first executes processes identical to the processes of steps S100-S104 of the demand-supply scheme planning scheme routine of FIG. 6, that is, executes a process (step S400) of inputting the stock record in each step, a process (step S402) of inputting the sales scheme of a unit period (e.g., one month) of the sales steps 102, 104, and a process (step S404) of calculating a total of order (amount of order placement) for each product from each of the sales steps 102, 104 to the product-producing steps 112, 114, that is, separately for each sales step.

Next, the CPU 42 distributes the amount of order placement for each product from each of the sales steps 102, 104 so that the product cost (sum of the cost regarding the production of the product and the transportation cost thereof) becomes minimum (step S406), and calculates an order receivable range of each product-producing step (step S408). The distribution of the amount of order placement for minimizing the product cost and the calculation of an order receivable range are described above. Subsequently, the CPU 42 prepares a list that includes the order placement to each product-producing step and the order receivable range of each product-producing step (step S410), and outputs the list to the graphics controller 52 or the like (step S412), and then ends the routine.

The prepared list makes it possible to determine whether the processing capability of a product-producing step is excessive or insufficient based on whether the allocation to that product-producing step of the amount of order placement for minimizing the product cost is within the order receivable range of the product-producing step. By considering such lists of several months or several years, it is possible to know the transition of the processing capability requirement of each product-producing step, and therefore contribute to the development and maintenance scheme of each product-producing step in a long-term view.

Although specific examples of the products A, B, C, D are not indicated above in conjunction with the demand-supply scheme planning apparatus 20 of this embodiment, the products A, B, C, D may be any products as long as they can be produced by the product-producing step.

Although the demand-supply scheme planning apparatus 20 for planning a demand-supply scheme regarding a supply chain of products and parts has been described as an embodiment of the invention, the invention is also applicable to a demand-supply scheme planning apparatus for planning a demand-supply scheme regarding a supply chain of services. The services include services that involve goods, such as repair of a product or a component part, or the like, services that do not involve goods, such as provision of a manpower service, or the like. The order placement or purchase of a service can be considered as order placement or purchase of equipment, manpower, or the like that is necessary to provide the service. The supply of a service can be considered as provision of a service. The stock in a supply chain of a product or a component part can be considered as a surplus of equipment, manpower or the like that is necessary to provide a service in a step in a supply chain of services.

Another embodiment of the invention will next be described.

Figure 14:
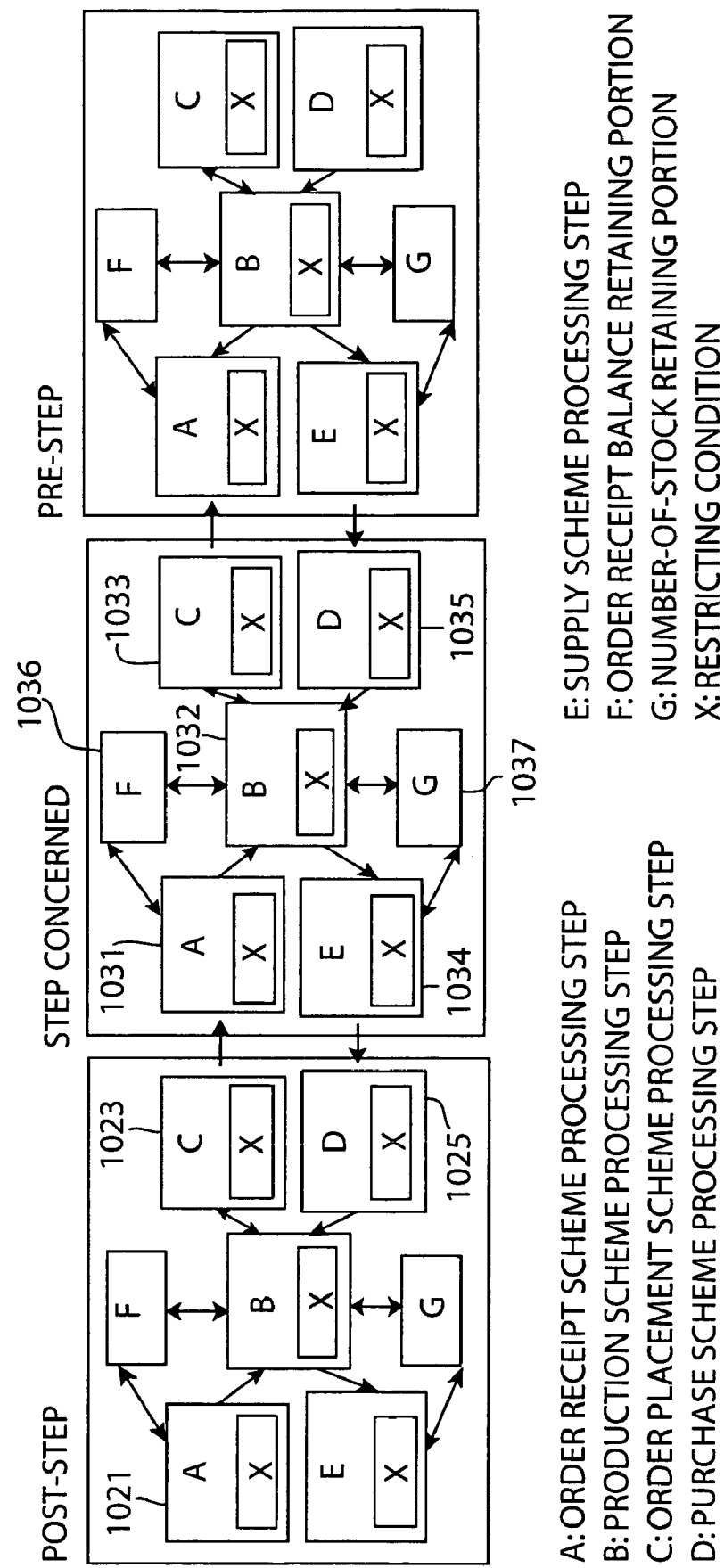
FIG. 14 is a block construction diagram illustrating a production scheme planning system in accordance with another embodiment of the invention.

FIG. 14 is a block diagram illustrating a production scheme planning system according to the embodiment. FIG. 14 illustrates only a step concerned and its preceding and succeeding steps for the sake of convenience, where only one pre-step and only one post-step are shown. However, the embodiment can easily be applied to a form in which a plurality of locations are connected, if in each one of the connected steps, a scheme planning process described below is sequentially repeated, or a process of collecting or distributing information exchanged with the pre-step and the post-step is executed.

In this embodiment, each step is provided with a single production scheme planning apparatus. Each planning apparatus exchanges with each of the preceding and succeeding steps information regarding numbers of material flow, that is, scheme numbers of order receipt and placement, purchase and supply, and then plans a production scheme for its own step. Each production scheme planning apparatus has a hardware construction as shown in FIG. 2, as in the foregoing embodiment.

The production scheme planning apparatus 1030 disposed in the step concerned includes an order receipt scheme processing portion 1031, a production scheme processing portion 1032, an order placement scheme processing portion 1033, a purchase scheme processing portion 1034, a supply scheme processing portion 1035, an order receipt balance retaining portion 1036, and a number-of-stock retaining portion 1037. In this embodiment, the scheme planning portions 1031-1035 (corresponding to the CPU 42, the main memory 50, etc. in FIG. 2) are provided corresponding to the schemes that the portions need to plan. The scheme number of order receipt is a number requested of the step concerned by the post-step. If the step concerned produces vehicles, the scheme number of order receipt is the number of vehicles. If the step concerned produces component parts, the scheme number of order receipt is the number of component parts. In the description below, the scheme number of order receipt is generically termed "number of pieces". The scheme number of production is the number of pieces planned upon receiving an order. The scheme number of order placement is the number of component parts or the like that are ordered to the pre-step and that are needed to accomplish production in conformance with the production scheme planned by the step concerned. The supply scheme number is the scheme number of pieces to be supplied from the step concerned to the post-step, that is, a scheme based on timing of arrival at the step concerned. The scheme processing portions 1031-1035 execute processes of determining the scheme numbers through calculation or the like.

The order receipt balance number is the number of pieces that are ordered by the post-step but are yet to be processed, and is calculated as in the following expression: the order receipt balance number of the preceding period+the order receipt balance number of the present period−the scheme number of production of the present period. The number of stock is the number of pieces that have been produced but have not been shipped to the post-step, and is calculated as in the following expression: the number of stock of the preceding period+the scheme number of production of the present period−the shipment scheme number of the present period. The retaining portions 1036, 1037 are updated in real time by the production scheme processing portion 1032 and the supply scheme processing portion 1035, and retain the number of order receipt balance and the number of stock at that time.

In this embodiment, restricting conditions regarding production, flow of goods, etc., can be set for the scheme processing portions 1031-1035. The restricting condition set for each scheme will next be described.

FIG. 15 shows a restricting condition table for presetting restricting conditions in this embodiment. For each item, maximum, normal and minimum values can be set as condition values. For example, in FIG. 15, a restricting condition regarding overtime is set, which indicates that if overtime is to be done in order to increase the number of production, overtime cannot be unconditionally put on the normal working time A, but is only allowed up to a maximum time Omax.

Furthermore, with regard to the normal capability restricting conditions, that is, a maximum Cmax, a normal Cnor and a minimum Cmin, are set. The normal capability herein corresponds to the number of pieces produced, with respect to the producing capability, and corresponds to the number of pieces supplied, with respect to the supplying capability, and is a restricting condition imposed on each of the production scheme processing portion 1032 and the supply scheme processing portion 1035.

Figures 16, 17:
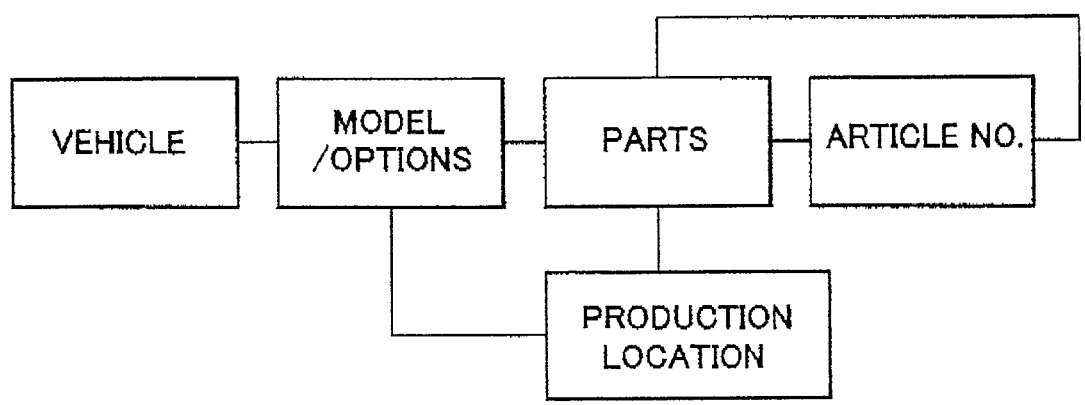
FIG. 16 exemplifies the content of a database of working days.
FIG. 17 is a conceptual diagram indicating relationships among pieces of data that form a database of components.

From these restricting conditions, it can be understood that restricting conditions that can be expressed by the following expressions (3) to (5). The number of working days D is preset in a database of working days as indicated in FIG. 16.

$$\text{maximum number of pieces produced} = \{D + (D \times O\text{max})/A + H\text{max}\} \times C\text{max} \quad (3)$$

$$\text{normal number of pieces produced} = D \times C\text{nor} \quad (4)$$

$$\text{minimum number of pieces produced} = D \times C\text{min} \quad (5)$$

Generally, the normal capability C of a producing location can be determined by the following expression (6).

$$C = A \times \text{operating rate/cycle time} \quad (6)$$

In expression (6), as the operating rate can be arbitrarily set, the normal capability C is usually determined by the cycle time, which indicates the amount of production per hour. Similarly, at a sales location, a sales capability can be used as a restricting condition. For example, if a sales location is regarded as a country, a restricting condition of the maximum sales capability can be considered as an upper limit number of pieces registered (pieces exported or imported). Each location is a unit that carries out schemes of order receipt and placement, and of production or sales. The size of each location is flexible, from a level of a step in a production factory to a level of a country as in the aforementioned example.

The processes of the scheme processing portions 1031-1035 of the production scheme planning apparatus 1030 will be sequentially described below.

The order receipt scheme processing portion 1031 plans an order receipt scheme. In a simplest model (where adjustments such as shifts by amounts of lead time of the step concerned and the pre-step are still needed), the order receipt scheme processing portion 1031, upon receiving the number ordered by the order placement scheme processing portion 1023 of the post-step, can directly determine the received number as a scheme number of order receipt. In reality, however, a plurality of post-steps can exist. In such a case, the order receipt scheme processing portion 1031 determines a result obtained by totalizing the received numbers, as a scheme number of order receipt. Furthermore, if there is an order receipt balance, the number of the order receipt balance needs to be added to the scheme number of order receipt. If there is a restricting condition, the scheme number of order receipt needs to be corrected so that a final scheme number of order receipt meets the restricting condition.

If the scheme number of order receipt obtained through calculation exceeds a maximum scheme number of order receipt set in the restricting condition, the scheme number of order receipt is corrected so as to be equal to or less than the maximum scheme number of order receipt. The difference between the calculated scheme number of order receipt and the maximum scheme number of order receipt is eventually written as a number of order receipt balance of the present period into the order receipt balance retaining portion 1036. The difference corresponds to a total number of pieces that cannot be supplied in conformance with the order placement schemes from the order placement scheme processing portion 1023 of the plural post-steps, which means that pieces cannot be supplied to some of the post-steps as requested (i.e., in conformance with the order placement schemes). In such a case, a process of distributing the corrected scheme number of order placement to the post-steps that placed orders is necessary. One method for distribution is a main location designation rule. The main location designation rule is a rule in which the post-steps are assigned with priorities as restricting conditions, and orders from the post-steps are processed in the order of descending priorities of the post-steps to supply vehicles or the like to the post-steps. In this case, some post-steps find that their ordered numbers of vehicles or like are not processed. In such post-steps, therefore, it is necessary to re-plan an order placement scheme or a production scheme. A process regarding the re-planning will be described below. It should be noted herein that it is also possible to distribute the corrected maximum scheme number of order receipt in proportion to the numbers of order receipt (scheme numbers of order placement of the post-steps). It is also possible to take the past track records of the post-steps into consideration.

The order receipt scheme processing portion 1031 is able to automatically plan an order receipt scheme. The order receipt scheme processing portion included in the leading step in the entire system does not receive a number of order placement from a post-step, and therefore determines a number of order receipt based on an input or a prediction.

The production scheme processing portion 1032 plans a production scheme based on the order receipt scheme planned by the order receipt scheme processing portion 1031. The production scheme processing portion 1032 can simply determine a scheme number of production directly from the scheme number of order receipt. However, if stock exists, the production scheme processing portion 1032 needs to subtract the number of stock from the scheme number of order receipt. If there is a restricting condition, the production scheme processing portion 1032 needs to adjust the scheme number of production. For example, if the calculated scheme number of production exceeds a maximum number of pieces that can be produced, which is determined by the expression (3), the difference therebetween is posted as a number of order receipt balance to update the order receipt balance retaining portion 1036. It is also possible to predict transition of the number of order receipt balance and thereby derive a production scheme by focusing attention on regularity of changes in the number of order receipt balance.

The order placement scheme processing portion 1033 plans an order placement scheme based on the production scheme planned by the production scheme processing portion 1032, by referring to a database of components (not shown). FIG. 17 is a conceptual diagram indicating the relationship among pieces of data of a components database. If the step concerned is a vehicle assembly step, the order placement scheme processing portion 1033 lists up parts to be assembled to vehicles that are an object of a production scheme and the numbers of the parts, and plans a scheme regarding which steps to order the parts for the assembly to. The components database stores information needed for such planning. That is, as indicated in FIG. 17, the database stores the vehicles that are objects of production in the step concerned, vehicle models and their options, parts that form each model and options, and the numbers of the parts, producing locations for producing the models and options or parts, and the article Nos. of parts, which are related to one another. Furthermore, if parts that form vehicle models and options are produced in the step concerned, the database further stores component parts that form the parts to be produced and the number of the component parts, producing locations for producing the component parts, and the article Nos. of the component parts, which are related to one another.

The order placement scheme processing portion 1033 searches for the vehicle models and options that are objects of the production scheme, and determine parts that form the vehicle models and options and component parts that form the parts, and the numbers thereof. Then, by multiplying the determined necessary numbers of parts by the scheme number of production, the order placement scheme processing portion 1033 determines the scheme numbers of order placement for the individual parts. It should be apparent that if there are plurality of pre-steps, the scheme number of order placement is allocated to the pre-steps. If identical parts can be supplied from a plurality of pre-steps, the number of order placement for the identical parts is allocated to the pre-steps, taking restricting conditions and the like into consideration.

The order placement scheme planned by the order placement scheme processing portion 1033 is received by the order receipt scheme processing portion 1021 of the pre-step. The content of processing performed by the order receipt scheme processing portion 1021 is substantially the same as that performed by the order receipt scheme processing portion 1031, and a difference merely lies in the content of information handled (product names, numbers of parts, etc.).

Through the processes described above, schemes are prepared in the sequence of order receipt, production and order placement in the direction from post-steps to pre-steps, taking the restricting conditions of the individual schemes into consideration. For example, schemes of order receipt, production and order placement are planned in a final product assembly step, a primary article producing step and a secondary article producing step. After these schemes are planned, purchase schemes are planned in the opposite direction, that is, the direction from pre-steps to post-steps. Based on the purchase schemes, the production schemes are corrected, and supply schemes are planned.

The purchase scheme processing portion 1034 plans a supply scheme based on the supply scheme planned by the supply scheme processing portion 1025 of the pre-step. In a simplest model (where adjustments such as shifts by amounts of lead time of the step concerned and the pre-step are still needed), the purchase scheme processing portion 1034, upon receiving the scheme number of supply from the supply scheme processing portion 1025 of the pre-step, can directly determine the received number as a scheme number of purchase. In reality, however, a plurality of pre-steps can exist. In such a case, the purchase scheme processing portion 1034 determines a result obtained by totalizing the received numbers, as a scheme number of purchase. That is, since the scheme number of purchase equals a total of the scheme numbers of supply from the pre-steps, the purchase scheme processing portion 1034 can be said to be a processing portion for receiving and totalizing the scheme numbers of supply. If the scheme number of purchase is greater than or equal to the scheme number of production, it is determined that production can be accomplished in conformance with the production scheme, and therefore the production scheme is not corrected. If the scheme number of purchase is less than the scheme number of production, it means that parts necessary for production in conformance with the production scheme have not been completely obtained, and therefore it is necessary to correct the scheme number of production based on the scheme number of purchase. That is, the production scheme processing portion 1032 re-plans a production scheme based on the scheme number of purchase. Then, based on the re-planned production scheme, the order placement scheme processing portion 1033 re-plans an order placement scheme. It is to be noted herein that the number of stock is information to be considered by the purchase scheme processing portion 1035, and is not considered in this process.

After the scheme number of production is determined, the supply scheme processing portion 1035 plans a supply scheme. First, the supply scheme processing portion 1035 determines a sum of the scheme number of production calculated by the production scheme processing portion 1032 and the number of stock stored in the number-of-stock retaining portion 1037 (that is, a shippable number). Therefore, if the shippable number is greater than or equal to the scheme number of order receipt calculated by the order receipt scheme processing portion 1031, the scheme number of order receipt is immediately set as a basic value of the scheme number of supply. The difference between the shippable number and the basic value is determined as a number of stock, whereby the order receipt balance retaining portion 1036 is updated. If the shippable number is less than the scheme number of order receipt, the shippable number is determined as a basic value of the scheme number of supply. In this case, the number of stock becomes zero. If there is only one post-step, the basic value determined in the above-described process is simply sent as the scheme number of supply to the production scheme processing portion of the post-step. If there are a plurality of post-steps, the basic value is distributed to the post-steps in accordance with the scheme numbers of order receipt sent from the post-steps provided that the shippable number is greater than or equal to the scheme number of order receipt. However, provided that the shippable number is less than the scheme number of order receipt, it is necessary to perform adjustment, such as allocation in accordance with the ratio between the basic value and the scheme number of order receipt sent from each post-step.

Before the scheme number of supply is sent to the post-step, the supply scheme processing portion 1035 performs such a correction as to meet a restricting condition set in the supply scheme processing portion 1035, if necessary. Furthermore, if a restricting condition regarding material flow, it is necessary to perform a correction that complies with the condition.

Thus, purchase schemes and supply schemes are planned in the direction from pre-steps toward post-steps, and production schemes are corrected if necessary. When it become necessary to revise any one of the schemes, each scheme is corrected again in the direction from post-steps toward pre-steps. In accordance with the correction, each scheme is corrected in the direction from pre-steps toward post-steps. The production scheme planning system of this embodiment plans various schemes in the sequence of scheme-object periods, by repeatedly performing the above-described process.

In this embodiment, schemes of individual connected steps are sequentially planned, so that during the planning of schemes in each step, the contents of schemes of other steps can be reflected. That is, the scheme processing portions 1031-1035 are designed in such a manner that restricting conditions can be set. Therefore, during the scheme planning of each scheme processing portion 1031-1035, individually set restricting conditions can be reflected. Hence, schemes with high precision can be planned. Furthermore, with reference to the scheme numbers that are exchanged between a plurality of steps or within steps while being corrected, it is possible to easily determine which scheme of which step has a restricting condition that bottlenecks the scheme planning and that adversely affects the scheme planning of the entire system. Therefore, by improving the production step that cannot help but set the bottlenecking restricting condition of a scheme planning portion, and by correcting the restricting condition as much as possible, the production efficiency of the entire system can be improved.

Although in this embodiment, the process of comparing scheme numbers is performed, the scheme numbers compared are the scheme numbers of identical vehicles, identical models or options, or identical parts. Therefore, it should be apparent that if the production scheme planning apparatuses handle a plurality of kinds of vehicles, production scheme planning or the like is performed for each kind of vehicle.

Furthermore, although in the embodiment, production schemes are planned within a range limited to connected production scheme planning apparatuses, it is also possible to set a restricting condition based on other factors, for example, a restricting condition such that pushed-up production is performed to increase the stock in anticipation of an increase in the number of order-received pieces during a peak period.

Still further, although the embodiment is described above in conjunction with an example of the production scheme planning, the embodiment is also applicable to sales schemes.

This embodiment makes it possible to set restricting conditions regarding production, material flow, etc., for each scheme planning means, and makes it possible to reflect the individually set restricting conditions during the planning of each scheme. Therefore, schemes with increased precision can be planned.

Furthermore, in the embodiment, scheme planning means for planning schemes regarding order placement and receipt and sales or production are provided corresponding to the schemes to be planned, in each location. This construction makes it possible to provide each location with a general-purposed construction, and further facilitates unifications and abolishment of places for integration into a system.

The invention is also applicable to a program that causes a computer to function as a scheme planning apparatus such as the demand-supply scheme planning apparatus 20 or the production scheme planning apparatuses and is also applicable to a recording medium in which such a program is recorded in a computer-readable fashion. The recording medium includes CD-ROMs, floppy disks, DVD-ROMs, and various other media. The recording medium may also be a computer-readable program transmission medium that causes a computer to function as a scheme planning apparatus.

While the invention has been described with reference to what are presently considered to be preferred embodiments thereof, it is to be understood that the invention is not limited to the disclosed embodiments or constructions. On the contrary, the invention is intended to cover various modifications and equivalent arrangements within the spirit and scope of the invention.

What is claimed is:

1. A demand-supply scheme planning apparatus comprising:
    first means for storing data regarding a cost and a time that are needed between a purchase step and a supply step of each demand-supply step of a supply chain and stock amount of items required in each demand-supply step, the supply chain including a plurality of demand-supply steps each having an order receipt step, an order placement step, a purchase step, and a supply step that are related to a commodity;
    second means for inputting an order receipt scheme, which includes an order quantity, of a demand-supply step of the plurality of demand-supply steps that is located at a supply-side terminal of the supply chain;
    third means for determining basic scheme data regarding the order receipt step, the order placement step, the purchase step, and the supply step of each of the plurality of demand-supply steps based on the inputted order receipt scheme and at least the stored data relating to the stock amount items required, for each demand-supply step, and distributes the order quantity among the plurality of demand-supply steps based on the basic scheme data of each demand-supply step, the third means determining an amount of order placement of each demand-supply step, based on at least an amount of order receipt, an amount of stock, and a target amount of stock allocated to each demand-supply step from the stock amount;
    fourth means for calculating a profitability index of each demand-supply step of the supply chain based on the basic scheme data determined and the data stored by the first means;
    fifth means for adjusting the basic scheme of at least one demand-supply step by at least one of a) changing an initial distribution of the order quantity of the order receipt step, b) advancing or delaying at least a portion of an order amount of the order placement step, and c) changing a target amount of stock of items allocated to the demand-supply step from the stock amount, wherein the fourth means calculates a first profitability index for a first version of the supply chain without making said adjustments, and calculates an additional profitability index for each adjusted version of the supply chain after making said adjustment; and
    sixth means for establishing a demand-supply scheme for manufacturing the commodity by selecting the version of the supply chain having the highest calculated profitability index.

2. An apparatus according to claim 1, wherein the commodity includes a product and a part.

3. An apparatus according to claim 1, wherein the commodity includes a service.

4. An apparatus according to claim 1, wherein the fifth means further adjusts the basic scheme of the at least one demand-supply step by changing the target amount of stock.

5. An apparatus according to claim 1, wherein the first means further stores data regarding an order-receivable amount of each demand-supply step, and the fifth means further adjusts the basic scheme of the at least one demand-supply step by changing a predetermined parameter regarding order receipt within the order-receivable amount.

6. An apparatus according to claim 1, wherein the fifth means further adjusts the basic scheme of the at least one demand-supply step by changing a predetermined parameter that sets a starting timing of the order placement step.

7. An apparatus according to claim 1, further comprising an adjustment means for adjusting a distribution of the scheme data regarding the order receipt step, the order placement step, the purchase step and the supply step for each of the plurality of demand-supply steps.

8. A program stored on a computer readable medium, the program having instructions for causing a computer to execute a demand-supply scheme planning method, comprising the steps of:
    A) storing first data regarding a cost and a time that are needed between a purchase step and a supply step of each demand-supply step of a supply chain in which a plurality of demand-supply steps each having an order receipt step, an order placement step, a purchase step, and a supply step that are related to a commodity, and second data regarding stock amounts of items required in each demand-supply step;
    B) inputting an order receipt scheme, which includes an order quantity, of a demand-supply step of the plurality of demand-supply steps that is located at a supply-side terminal of the supply chain;
    C) determining basic scheme data regarding the order receipt step, the order placement step, the purchase step, and the supply step of each of the plurality of demand-supply steps based on the inputted order receipt scheme and at least the stored data relating to the stock amount of items required, for each demand-supply step;
    D) determining an amount of order placement of each demand-supply step, based on at least an amount of order receipt, an amount of stock, and a target amount of stock allocated to each demand-supply step from the stock amount;
    E) determining a supply chain distribution scheme by distributing the order quantity among the plurality of demand-supply steps based upon the basic scheme data of each demand-supply step;
    F) adjusting the basic scheme data of at least one demand-supply step by at least one of a) changing an initial distribution of the order quantity of the order receipt step, b) advancing or delaying at least a portion of an order amount of the order placement step, and c) changing a target amount of stock of items allocated to the demand-supply step from the stock amount;
    G) calculating a first profitability index for a first version of the supply chain distribution scheme in which said adjustment has not been made;
    H) calculating an additional profitability index for each adjusted supply chain distribution scheme in which said adjustment has been made; and I) selecting the supply chain distribution scheme having the highest calculated profitability index as the supply chain distribution scheme to be used in manufacturing the commodity.

9. A program according to claim 8, wherein the commodity includes a product and a part.

10. A program according to claim 8, wherein the commodity include a service.

11. A program according to claim 8 wherein step F further comprises changing a predetermined parameter constituting the target amount of stock.

12. A program according to claim 8, further comprising:
storing data regarding an order-receivable amount of each demand-supply step; and
wherein step E further comprises changing a predetermined parameter relating to order receipt within the order-receivable amount.

13. A program according to claim 8, wherein step E further comprises changing a predetermined parameter that sets a starting timing of the order placement step.

14. A computer programmed to perform the program according to claim 8.

15. A program according to claim 8, wherein step G further includes adjusting a distribution of the scheme data regarding the order receipt step, the order placement step, the purchase step and the supply step for each of the plurality of demand-supply steps.

16. A demand-supply scheme planning apparatus comprising:
first means for storing first data regarding a cost and a time that are needed between purchase of a product or a part and shipment of the product in each demand-supply step of a supply chain, second data regarding a transportation cost involved in the shipment of the product and a time needed for transportation of the product, third data regarding target stock amount of the product and the member of each demand-supply step, fourth data regarding stock amounts of items required in each demand-supply step, and fifth data regarding an amount of order receipt wherein each demand-supply step places an order for a product or a member for producing the product upon receiving an order for the product, and determines an amount of order placement based on at least an amount of order receipt, an amount of stock, and a target amount of stock, and ships the product purchased in accordance with the order placed, or produces and ships the product using the member purchased in accordance with the order placed;
second means for inputting stock records of the product and the member of each demand-supply step of the supply chain;
third means for inputting an order receipt scheme, which includes an order quantity, of the product of a demand-supply step located at a shipment-side terminal of the supply chain;
fourth means for calculating a first profitability index for a first version of the supply chain, based on basic scheme data regarding order receipt, order placement, purchase and shipment of each demand-supply step, and the data stored by the first means, and an additional profitability index for at least one second version of the supply chain after adjusting the basic scheme data of at least one demand-supply step by at least one of a) changing an initial distribution of the order quantity of the order receipt step, b) advancing or delaying at least a portion of an order amount of the order placement step, and c) changing a target amount of stock of items allocated to the demand-supply step from the stock amount
fifth means for establishing a demand-supply scheme by selecting the version of the supply chain having the highest calculated profitability index.

17. An apparatus according to claim 16, wherein the fifth means determines a deviation between a value obtained by subtracting the order receipt scheme of the demand-supply step located at the shipment-side terminal from the stock record of the demand-supply step and the stock target value of the demand-supply step, as an amount of order placement, and distributing the amount of order placement as order placement to a demand-supply step where the order placement from the demand-supply step at the shipment-side terminal is possible, in such a manner that a profit increases, based on the first and the second data stored by the first means.

18. An apparatus according to claim 16, further comprising:
sixth means for setting an order receivable range of each demand-supply step based on a fourth data regarding a product order receivable range of each demand-supply step stored in data stored by the first means; and
seventh means for determining appropriateness of each demand-supply step based on the order receivable range set by the sixth means and the order receipt of each demand-supply step set by the fifth means.

19. An apparatus according to claim 18, wherein the seventh means determines whether a processing capability of each demand-supply step is excess or insufficient.

20. An apparatus according to claim 16, further comprising:
sixth means for setting an order receivable range of each demand-supply step based on a fourth data regarding a product order receivable range of each demand-supply step stored in data stored by the first means; and
seventh means for determining whether the order receipt of each demand-supply step used by the fifth means is within the order receivable range set for the corresponding demand-supply step by the sixth means; and
eighth means for, if the seventh means determines that the order receipt is not within the order receivable range, changing the scheme data used by the fifth means so that the order receipt of the demand-supply step subjected to the determination becomes within the corresponding order receivable range.

21. An apparatus according to claim 20, wherein the eighth means switches a portion or a whole amount of the order receipt of the demand-supply step subjected to the determination to order receipt of a demand-supply step that is capable of shipping a product identical to that shipped by the demand-supply step subjected to the determination.

22. An apparatus according to claim 20, wherein the seventh means changes, in time, at least an amount of the order receipt of the demand-supply step subjected to the determination relative to the order receipt scheme.

23. An apparatus according to claim 22, wherein the seventh means determines whether a sum of the changed order receipt and the order receipt used by the fifth means is within the order receivable range set by the sixth means, if the eighth means accomplishes order receipt changing, in time, at least an amount of the order receipt.

24. An apparatus according to claim 20, wherein the eighth means changes at least a portion of the third data of each demand-supply step stored by the first means.

25. An apparatus according to claim 20, wherein the eighth means changes the scheme data so that the order receipt of each demand-supply step becomes within the corresponding order receivable range and so that the profitability index increase.

26. An apparatus according to claim 16, further comprising output means for outputting the scheme data used by the fifth means.

27. An apparatus according to claim 16, wherein said fifth means further adjusts the scheme data regarding order receipt, order placement, purchase and shipment of each demand-supply step.

28. A program stored on a computer readable medium, the program having instructions for causing a computer to execute a demand-supply scheme planning method comprising the steps of:

storing first data regarding a cost and a time that are needed between purchase of a product or a part and shipment of the product in each demand-supply step of a supply chain comprised of a plurality of demand-supply steps, second data regarding a transportation cost involved in the shipment of the product and a time needed for transportation of the product, third data regarding targets of stock of the product and the member of each demand-supply step, and fourth data regarding stock amounts of items required in each demand-supply step, wherein each demand-supply step places an order for a product or a member for producing the product upon receiving an order for the product, and that ships the product purchased in accordance with the order placed or that produces and ships the product using the member purchased in accordance with the order placed;

inputting stock records of the product and the member of each demand-supply step of the supply chain;

inputting a basic scheme for the order receipt step, order placement step, purchase step and supply step of each demand-supply step in accordance with an order quantity and at least the stored data relating to the stock amount of items required;

determining an amount of order placement of each demand-supply step, based on at least an amount of order receipt, an amount of stock, and a target amount of stock allocated to each demand-supply step from the stock amount;

inputting a supply chain distribution scheme by distributing the order quantity among the plurality of demand-supply steps based on the basic scheme of each demand-supply step;

adjusting the basic scheme of at least one demand-supply step by at least one of a) changing an initial distribution of the order quantity of the order receipt step, b) advancing or delaying at least a portion of an order amount of the order placement step, and c) changing a target amount of stock of items allocated to the demand-supply step from the stock amount;

calculating a first profitability index for a first version of the supply chain distribution scheme in which said adjustment has not been made;

calculating an additional profitability index for each supply chain distribution scheme in which said adjustment has been made; and selecting the supply chain distribution scheme having the highest calculated profitability index as the supply chain distribution scheme to be used in manufacturing the commodity.

29. A program according to claim 28, further comprising a step of: adjusting the scheme data regarding order receipt, order placement, purchase and shipment of each demand-supply step.

30. A supply chain distribution scheme planning apparatus comprising:

a data storage portion that stores parameters for a plurality of demand-supply steps that form a supply chain, wherein each demand-supply step includes an order receipt step, an order placement step, a purchase step, and a supply step, and wherein the stored parameters include stock amounts of items required in each demand-supply step;

a data input portion for inputting an order quantity;

a supply chain distribution scheme determining portion that determines a basic scheme for the order receipt step, order placement step, purchase step and supply step of each demand-supply step in accordance with the order quantity and at least one stored parameter, and determines a supply chain distribution scheme by distributing the order quantity among the plurality of demand-supply steps based on the basic scheme of each demand-supply step, the supply chain distribution scheme determining portion determining an amount of order placement of each demand-supply step, based on at least an amount of order receipt, an amount of stock, and a target amount of stock allocated to each demand-supply step from the stock amount;

an index calculating portion that calculates a profitability index of the supply chain distribution scheme based on the basic scheme determined by the supply chain distribution scheme determining portion for each demand-supply step of the supply chain;

a basic scheme adjustment portion that adjusts the basic scheme of at least one demand-supply step by at least one of a) changing an initial distribution of the order quantity of the order receipt step, b) advancing or delaying at least a portion of an order amount of the order placement step, and c) changing a target amount of stock of items allocated to the demand-supply step from the stock amount, wherein the index calculating portion calculates a first profitability index for a first version of the supply chain distribution scheme in which the basic scheme adjustment portion has not made said adjustment, and calculates a second profitability index for a second version of the supply chain distribution scheme in which said adjustment has been made by the basic scheme adjustment portion; and a selecting portion that selects the supply chain distribution scheme having the highest calculated profitability index as the supply chain distribution scheme to be used in manufacturing a commodity.

* * * * *